United States Patent
Akasaka et al.

(10) Patent No.: US 11,692,860 B2
(45) Date of Patent: Jul. 4, 2023

(54) THERMAL FLOW SENSOR

(71) Applicant: ROHM Co., LTD., Kyoto (JP)

(72) Inventors: Shunsuke Akasaka, Kyoto (JP);
Yurina Amamoto, Kyoto (JP); Keisuke Wakamoto, Kyoto (JP); Ken Nakahara, Kyoto (JP)

(73) Assignee: ROHM Co., LTD., Kyoto (JP)

( * ) Notice: Subject to any disclaimer, the term of this patent is extended or adjusted under 35 U.S.C. 154(b) by 282 days.

(21) Appl. No.: 17/201,133

(22) Filed: Mar. 15, 2021

(65) Prior Publication Data

US 2021/0293594 A1     Sep. 23, 2021

(30) Foreign Application Priority Data

Mar. 19, 2020    (JP) ................................ 2020-048825

(51) Int. Cl.
*G01F 1/69*    (2006.01)
(52) U.S. Cl.
CPC ..................... *G01F 1/69* (2013.01)
(58) Field of Classification Search
CPC ........... G01F 1/69; G01F 1/692; G01F 1/6845
See application file for complete search history.

(56) References Cited

U.S. PATENT DOCUMENTS

| 2010/0313651 | A1* | 12/2010 | Hidaka | G01F 1/692 73/204.26 |
| 2013/0139584 | A1* | 6/2013 | Qasimi | G01F 1/6842 29/592.1 |
| 2017/0038235 | A1* | 2/2017 | Zhao | G01F 1/692 |
| 2022/0146292 | A1* | 5/2022 | Beck | G01F 1/6847 |

FOREIGN PATENT DOCUMENTS

| CN | 108431555 | A | * | 8/2018 | .......... | G01F 1/6845 |
| EP | 2040045 | A2 | * | 3/2009 | .......... | G01F 1/6845 |
| JP | 2007071687 | | | 3/2007 | | |

* cited by examiner

*Primary Examiner* — Francis C Gray
(74) *Attorney, Agent, or Firm* — Chip Law Group

(57) ABSTRACT

Disclosed is a thermal flow sensor including a base member and a cover. The base member includes a heater. The cover is formed by an SOI substrate including a silicon substrate, a silicon dioxide film, and a silicon film. The silicon film has a recessed portion defined therein. A main flow passage portion is defined by an exposed surface of the silicon dioxide film which is exposed from the silicon film and which defines a bottom surface of the recessed portion, the silicon film defining a side surface of the recessed portion, and a first principal surface of the cover.

17 Claims, 28 Drawing Sheets

THERMAL FLOW SENSOR

CROSS REFERENCE TO RELATED APPLICATIONS

This application claims priority benefit of Japanese Patent Application No. JP 2020-048825 filed in the Japan Patent Office on Mar. 19, 2021. Each of the above-referenced applications is hereby incorporated herein by reference in its entirety.

BACKGROUND

The present disclosure relates to a thermal flow sensor.

JP 2007-71687A discloses a thermal flow sensor. This thermal flow sensor includes a sensor chip, and a flow passage-defining member provided on the sensor chip. A flow measurement section is formed on the sensor chip. A flow passage for a fluid is defined in the flow passage-defining member.

SUMMARY

In the flow sensor described in JP 2007-71687A, the flow passage-defining member is made of glass. The flow passage is formed through melting and molding of the glass or through etching of the glass. Therefore, it may be difficult to form the flow passage, which affects a flow of the fluid, so as to have a highly precise height, which may make it difficult to measure the flow rate of the fluid with high precision. The present disclosure has been conceived in view of the above problem, and it is desirable to provide a thermal flow sensor that is able to measure the flow rate of a fluid with improved precision.

A thermal flow sensor according to an embodiment of the present disclosure includes a base member, a cover, and a flow passage. The base member includes a first principal surface extending in a first direction and a second direction perpendicular to the first direction. The base member includes a heater. The cover is fixed to the first principal surface of the base member. The cover is formed by a silicon on insulator (SOI) substrate including a silicon substrate, a silicon dioxide film provided on the silicon substrate, and a silicon film provided on the silicon dioxide film. The silicon film has a recessed portion defined therein. The recessed portion has a bottom surface defined by an exposed surface of the silicon dioxide film which is exposed from the silicon film. The recessed portion has a side surface defined by the silicon film. The flow passage includes a main flow passage portion extending along the first principal surface, and defined by the exposed surface of the silicon dioxide film which defines the bottom surface of the recessed portion, the silicon film defining the side surface of the recessed portion, and the first principal surface. In a plan view of the first principal surface, the main flow passage portion has a first longitudinal direction parallel to the first direction. The cover has an inlet and an outlet of the flow passage defined therein. The heater is opposed to the main flow passage portion in a third direction perpendicular to both the first direction and the second direction.

The thermal flow sensor according to an embodiment of the present disclosure is able to measure the flow rate of a fluid with improved precision.

DETAILED DESCRIPTION OF THE PREFERRED EMBODIMENTS

Hereinafter, embodiments of the present disclosure will be described. Note that like parts are designated by like reference symbols, and descriptions thereof will not be repeated.

First Embodiment

With reference to FIGS. 1, 2, 3, 4, and 5, a thermal flow sensor 1 according to a first embodiment of the present disclosure will be described. The thermal flow sensor 1 includes a base member 2 and a cover 4 as main components thereof.

Figure 1:
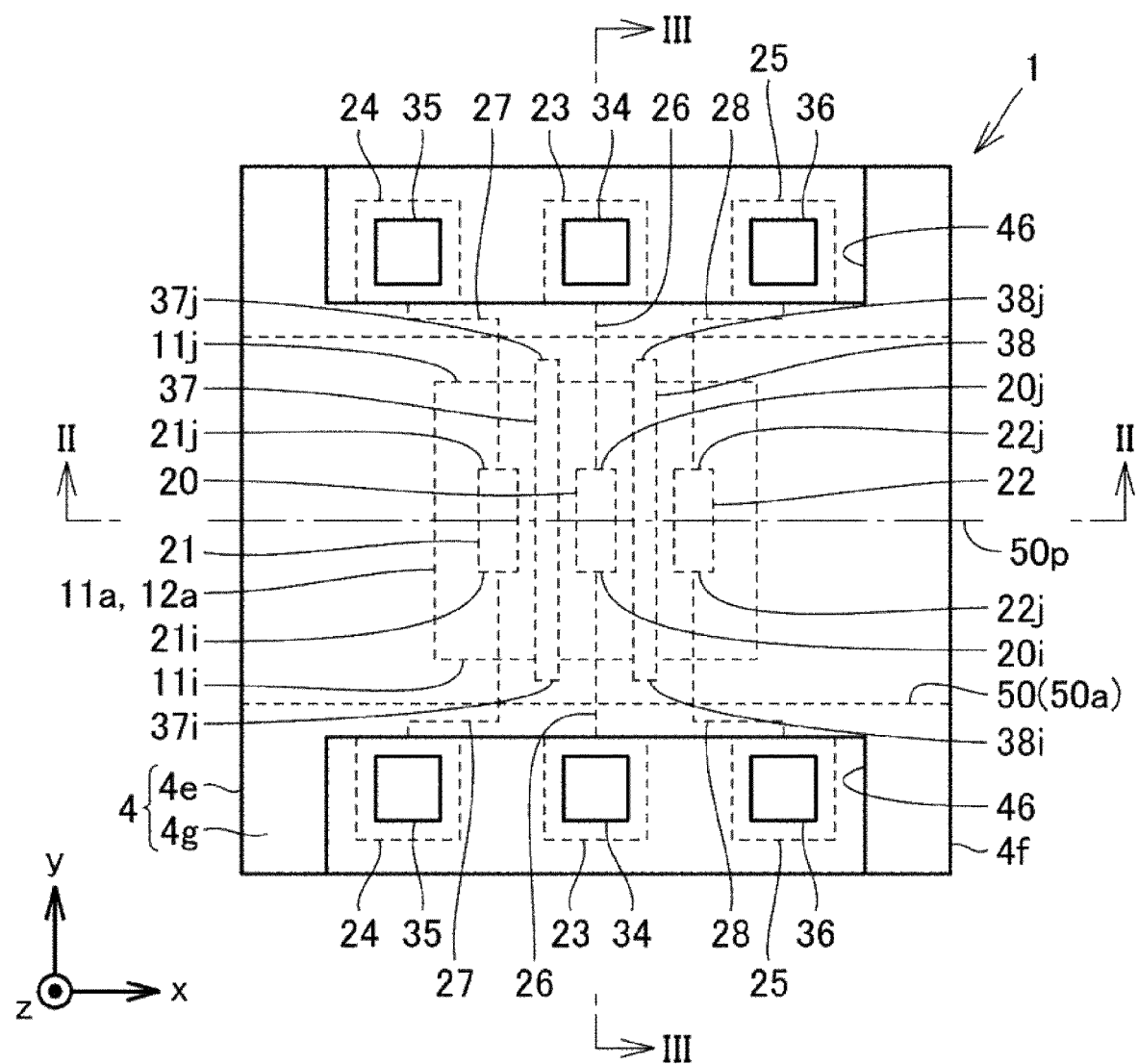
FIG. 1 is a schematic plan view of a thermal flow sensor according to a first embodiment of the present disclosure.
Figure 2:
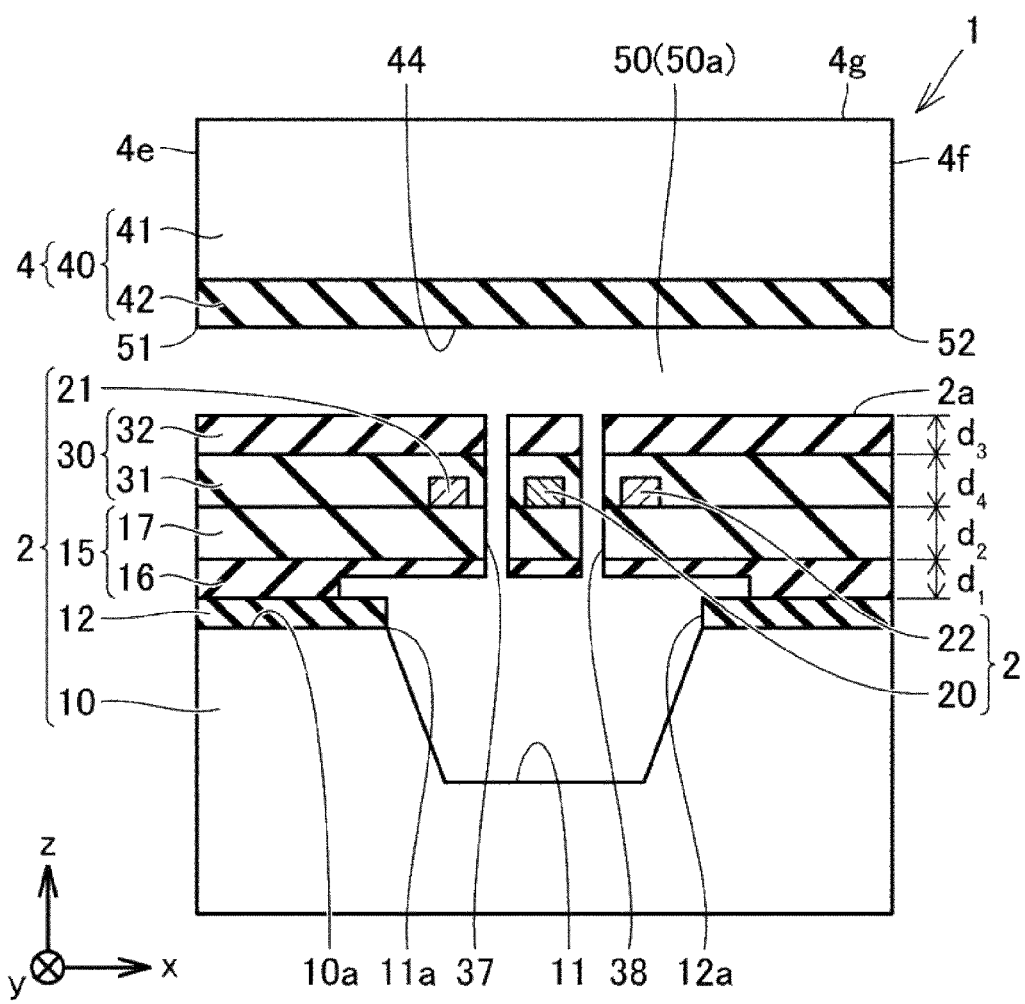
FIG. 2 is a schematic sectional view of the thermal flow sensor according to the first embodiment taken along line II-II in FIG. 1.
Figure 3:
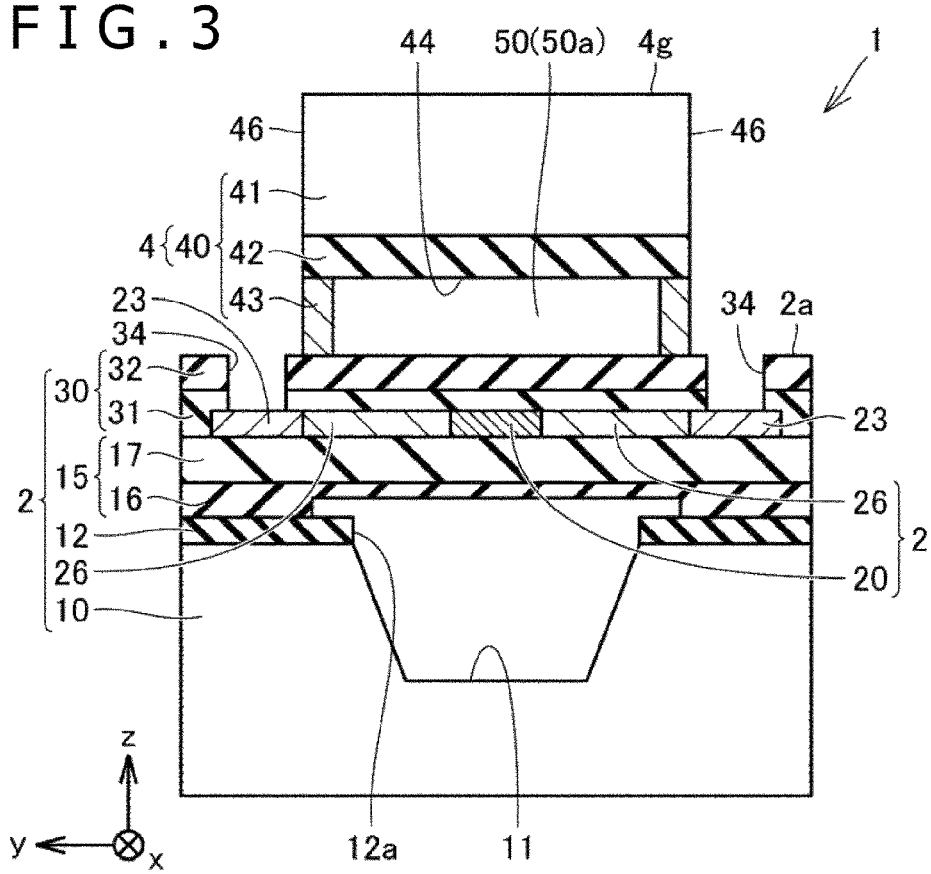
FIG. 3 is a schematic sectional view of the thermal flow sensor according to the first embodiment taken along line III-III in FIG. 1.

As illustrated in FIGS. 1 to 3, the base member 2 includes, as main components thereof, a substrate 10, a first insulating film 15, a heater 20, a first temperature sensor 21, a second temperature sensor 22, first pads 23, second pads 24 and 25, first wires 26, and second wires 27 and 28. The base member 2 may further include a second insulating film 30 and a third insulating film 12. The base member 2 includes a first principal surface 2a extending in a first direction (x direction) and a second direction (y direction) perpendicular to the first direction (x direction). The first principal surface 2a of the base member 2 is, for example, a surface of the second insulating film 30.

The substrate 10 may be an electrically conductive substrate, a semiconductor substrate, or an insulating substrate. The substrate 10 is, for example, a silicon substrate. The substrate 10 includes a second principal surface 10a. The second principal surface 10a extends in the first direction (x direction) and the second direction (y direction). The substrate 10 has a cavity 11 at a portion thereof corresponding to the heater 20, the first temperature sensor 21, and the second temperature sensor 22. An opening portion 11a of the cavity 11 is defined in the second principal surface 10a of the substrate 10. The cavity 11 is in communication with a first slit 37 and a second slit 38, which will be described below.

Figure 20:
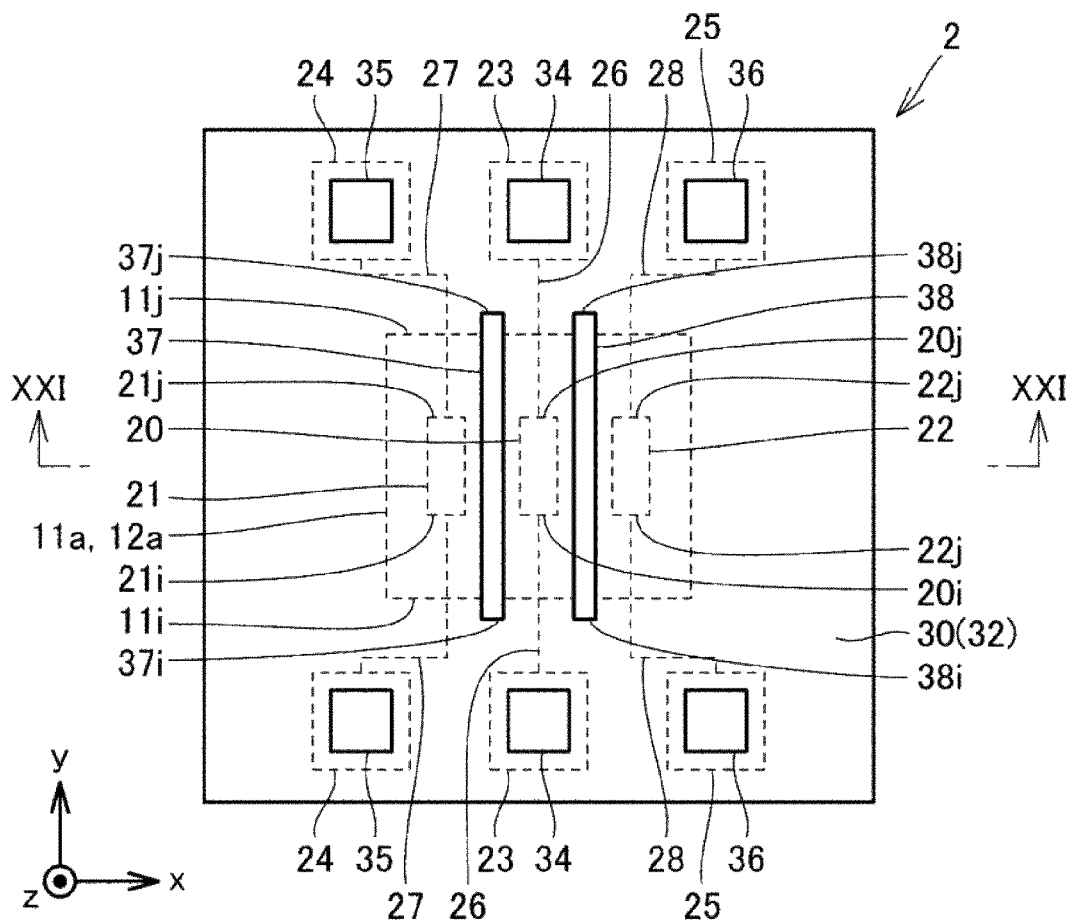
FIG. 20 is a schematic plan view illustrating a step following the step illustrated in FIGS. 18 and 19 in the step of making the base member in the method of manufacturing the thermal flow sensor according to the first embodiment.
Figure 21:
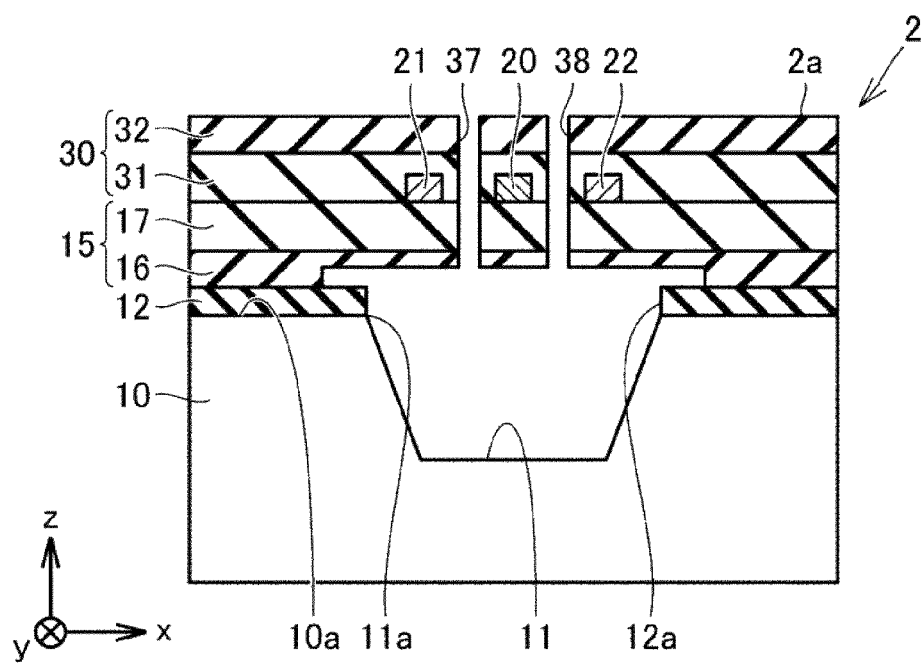
FIG. 21 is a schematic sectional view taken along line XXI-XXI in FIG. 20, illustrating the step illustrated in FIG. 20 in the step of making the base member in the method of manufacturing the thermal flow sensor according to the first embodiment.

As illustrated in FIGS. 2 and 3, the third insulating film 12 is provided on the second principal surface 10a of the substrate 10. The third insulating film 12 is, for example, a silicon dioxide ($SiO_2$) film. The third insulating film 12 has an opening 12a defined therein. The opening 12a of the third insulating film 12 is in alignment with the opening portion 11a of the cavity 11. The third insulating film 12 may serve as an etching mask when the substrate 10 is etched to form the cavity 11 in the substrate 10 as illustrated in FIGS. 20 and 21.

The first insulating film 15 is provided on the second principal surface 10a of the substrate 10. More specifically, the first insulating film 15 is provided on the second principal surface 10a of the substrate 10 with the third insulating film 12 therebetween. The first insulating film 15 is arranged between the substrate 10 and the heater 20, which will be described below. The first insulating film 15 extends above the cavity 11 of the substrate 10. Opposite ends of the first insulating film 15 are supported by the substrate 10. The first insulating film 15 has a structure like that of a beam supported at both ends.

The first insulating film 15 includes a first silicon nitride layer 16 and a first silicon dioxide layer 17. The first silicon nitride layer 16 may lie closer to the substrate 10 than does the first silicon dioxide layer 17. A first ratio of a second thickness $d_2$ of the first silicon dioxide layer 17 to a first thickness $d_1$ of the first silicon nitride layer 16 is greater than 1.0 and equal to or smaller than 5.5. More preferably, the first ratio of the second thickness $d_2$ of the first silicon dioxide layer 17 to the first thickness $d_1$ of the first silicon nitride layer 16 is greater than 3.0 and equal to or smaller than 5.0. This will lead to a good balance between a tensile stress applied to the first silicon nitride layer 16 and a compressive stress applied to the first silicon dioxide layer 17. This will lead to reducing or preventing a bending of the first insulating film 15 having a beam structure. The tensile stress applied to the first silicon nitride layer 16 is caused by a difference in coefficient of thermal expansion between the substrate 10 and the first silicon nitride layer 16. The tensile stress applied to the first silicon dioxide layer 17 is caused by a difference in coefficient of thermal expansion between the substrate 10 and the first silicon dioxide layer 17.

Figure 4:
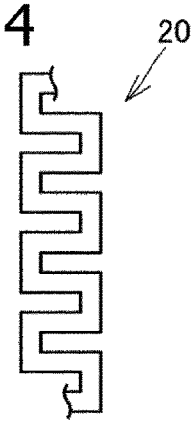
FIG. 4 is a schematic plan view of a portion of a heater included in the thermal flow sensor according to the first embodiment in an enlarged form.

As illustrated in FIGS. 1 to 3, the heater 20 is provided on the first insulating film 15. As illustrated in FIG. 4, the heater 20 may be formed by, for example, a conducting wire extending in a zigzag pattern. The heater 20 is made of, for example, a metal material, such as platinum. The heater 20 is opposed to a main flow passage portion 50a (i.e., a flow passage 50) in a third direction (z direction) perpendicular to both the first direction (x direction) and the second direction (y direction).

Figure 5:
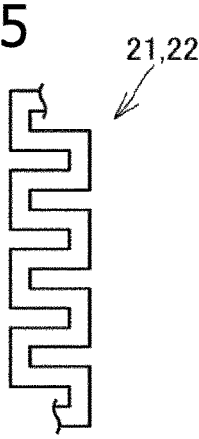
FIG. 5 is a schematic plan view of a portion of each of a first temperature sensor and a second temperature sensor included in the thermal flow sensor according to the first embodiment in an enlarged form.

As illustrated in FIGS. 1 and 2, the first temperature sensor 21 and the second temperature sensor 22 are provided on the first insulating film 15. The first temperature sensor 21 is disposed closer to an inlet 51 of the flow passage 50 in the first direction (x direction) than is the heater 20. The second temperature sensor 22 is disposed closer to an outlet 52 of the flow passage 50 in the first direction (x direction) than is the heater 20. As illustrated in FIG. 5, each of the first temperature sensor 21 and the second temperature sensor 22 may be formed by, for example, a conducting wire extending in a zigzag pattern. Each of the first temperature sensor 21 and the second temperature sensor 22 is made of, for example, a metal material, such as platinum. Each of the first temperature sensor 21 and the second temperature sensor 22 is opposed to the main flow passage portion 50a (i.e., the flow passage 50) in the third direction (z direction).

As illustrated in FIG. 1, the first pads 23 and the second pads 24 and 25 are provided on the first insulating film 15. Each of the first pads 23 and the second pads 24 and 25 is made of, for example, an electrically conductive material, such as platinum. The first wires 26 and the second wires 27 and 28 are provided on the first insulating film 15. Each of the first wires 26 and the second wires 27 and 28 is made of, for example, an electrically conductive material, such as platinum. Each first wire 26 is connected to the heater 20 and the corresponding first pad 23. Each second wire 27 is connected to the first temperature sensor 21 and the corresponding second pad 24. Each second wire 28 is connected to the second temperature sensor 22 and the corresponding second pad 25.

As illustrated in FIGS. 2 and 3, the second insulating film 30 is provided on the first insulating film 15. The second insulating film 30 covers the heater 20 and the first wires 26. The second insulating film 30 covers the first temperature sensor 21, the second temperature sensor 22, and the second wires 27 and 28. The second insulating film 30 extends above the cavity 11 of the substrate 10. Opposite ends of the second insulating film 30 are supported by the substrate 10. The second insulating film 30 has a structure like that of a beam supported at both ends.

The second insulating film 30 includes a second silicon dioxide layer 31 and a second silicon nitride layer 32. The second silicon dioxide layer 31 may lie closer to the substrate 10 than does the second silicon nitride layer 32. The second insulating film 30 may have a layer structure symmetrical to the first insulating film 15 with respect to an interface between the first insulating film 15 and the second insulating film 30. This will cause a bending of the second insulating film 30 to occur in a direction opposite to that of a bending of the first insulating film 15, canceling the bending of the first insulating film 15. This will lead to reducing or preventing bendings of the first insulating film 15 and the second insulating film 30 each having a beam structure.

A second ratio of a fourth thickness $d_4$ of the second silicon dioxide layer 31 to a third thickness $d_3$ of the second silicon nitride layer 32 is greater than 1.0 and equal to or smaller than 5.5. More preferably, the second ratio of the fourth thickness $d_4$ of the second silicon dioxide layer 31 to the third thickness $d_3$ of the second silicon nitride layer 32 is greater than 3.0 and equal to or smaller than 5.0. This will lead to a good balance between a tensile stress applied to the second silicon nitride layer 32 and a compressive stress applied to the second silicon dioxide layer 31. This will lead to reducing or preventing a bending of the second insulating film 30 having the beam structure. The tensile stress applied to the second silicon dioxide layer 31 is caused by a difference in coefficient of thermal expansion between the substrate 10 and the second silicon dioxide layer 31. The tensile stress applied to the second silicon nitride layer 32 is caused by a difference in coefficient of thermal expansion between the substrate 10 and the second silicon nitride layer 32.

As illustrated in FIG. 1, the second insulating film 30 has openings 34, 35, and 36 defined therein. Each first pad 23 is exposed through the corresponding opening 34. Each second pad 24 is exposed through the corresponding opening 35. Each second pad 25 is exposed through the corresponding opening 36.

As illustrated in FIGS. 1 and 2, each of the first slit 37 and the second slit 38 is defined in the first insulating film 15 and the second insulating film 30.

The first slit 37 passes through the first insulating film 15 and the second insulating film 30. The first slit 37 is provided between the heater 20 and the first temperature sensor 21 in the first direction (x direction). The first slit 37 is provided closer to the inlet 51 of the flow passage 50 than is the heater 20. The first slit 37 serves to prevent heat from being transferred from the heater 20 to the first temperature sensor 21 through the first insulating film 15 and the second insulating film 30.

The second slit 38 passes through the first insulating film 15 and the second insulating film 30. The second slit 38 is provided between the heater 20 and the second temperature sensor 22 in the first direction (x direction). The second slit 38 is provided closer to the outlet 52 of the flow passage 50 than is the heater 20. The second slit 38 serves to prevent heat from being transferred from the heater 20 to the second temperature sensor 22 through the first insulating film 15 and the second insulating film 30.

As illustrated in FIG. 1, the first slit 37 has a longitudinal direction parallel to the second direction (y direction). Opposite ends (i.e., ends 37i and 37j) of the first slit 37 in the second direction (y direction) are more distant from a center line 50p of the main flow passage portion 50a in the second direction (y direction) than are opposite ends (i.e., ends 20i and 20j) of the heater 20 in the second direction (y direction). This may contribute to more effectively preventing heat from being transferred from the heater 20 to the first temperature sensor 21 through the first insulating film 15 and the second insulating film 30.

The second slit 38 has a longitudinal direction parallel to the second direction (y direction). Opposite ends (i.e., ends 38i and 38j) of the second slit 38 in the second direction (y direction) are more distant from the center line 50p of the main flow passage portion 50a in the second direction (y direction) than are the opposite ends (i.e., the ends 20i and 20j) of the heater 20 in the second direction (y direction). This may contribute to more effectively preventing heat from being transferred from the heater 20 to the second temperature sensor 22 through the first insulating film 15 and the second insulating film 30.

The opposite ends (i.e., the ends 37i and 37j) of the first slit 37 in the second direction (y direction) may be in alignment with opposite edges (i.e., edges 11i and 11j) of the opening portion 11a of the cavity 11 in the second direction (y direction). As illustrated in FIG. 1, the opposite ends (i.e., the ends 37i and 37j) of the first slit 37 in the second direction (y direction) may be more distant from the center line 50p of the main flow passage portion 50a in the second direction (y direction) than are the opposite edges (i.e., the edges 11i and 11j) of the opening portion 11a of the cavity 11 in the second direction (y direction). This may contribute to more effectively preventing heat from being transferred from the heater 20 to the first temperature sensor 21 through the first insulating film 15 and the second insulating film 30.

The opposite ends (i.e., the ends 38i and 38j) of the second slit 38 in the second direction (y direction) may be in alignment with the opposite edges (i.e., the edges 11i and 11j) of the opening portion 11a of the cavity 11 in the second direction (y direction). As illustrated in FIG. 1, the opposite ends (i.e., the ends 38i and 38j) of the second slit 38 in the second direction (y direction) are more distant from the center line 50p of the main flow passage portion 50a in the second direction (y direction) than are the opposite edges (i.e., the edges 11i and 11j) of the opening portion 11a of the cavity 11 in the second direction (y direction). This may contribute to more effectively preventing heat from being transferred from the heater 20 to the second temperature sensor 22 through the first insulating film 15 and the second insulating film 30.

As illustrated in FIGS. 1 to 3, the cover 4 is fixed to the first principal surface 2a of the base member 2. The cover 4 is joined to the first principal surface 2a of the base member 2 using a joining member (not illustrated), such as an adhesive, for example. The cover 4 is formed by a silicon-on-insulator substrate (i.e., an SOI substrate 40). The SOI substrate 40 includes a silicon substrate 41, a silicon dioxide film 42 provided on the silicon substrate 41, and a silicon film 43 provided on the silicon dioxide film 42. The silicon dioxide film 42 lies between the silicon substrate 41 and the silicon film 43 and electrically insulates the silicon film 43 from the silicon substrate 41. The cover 4 includes a first side surface 4e and a second side surface 4f that define opposite end surfaces of the cover 4 in the first direction (x direction). The cover 4 includes a third principal surface 4g that is distant from the base member 2. The third principal surface 4g of the cover 4 is connected to the first side surface 4e and the second side surface 4f of the cover 4.

The silicon film 43 has a recessed portion 44 defined therein. A bottom surface of the recessed portion 44 is defined by an exposed surface of the silicon dioxide film 42 which is exposed from the silicon film 43. Side surfaces of the recessed portion 44 are defined by the silicon film 43. The main flow passage portion 50a, which is a portion of the flow passage 50 which extends along the first principal surface 2a, is defined by the exposed surface of the silicon dioxide film 42 which defines the bottom surface of the recessed portion 44, portions of the silicon film 43 which define the side surfaces of the recessed portion 44, and the first principal surface 2a. The height of the main flow passage portion 50a (i.e., the flow passage 50) is defined by the depth of the recessed portion 44. The depth of the recessed portion 44 is equal to the thickness of the silicon film 43 of the SOI substrate 40. This allows the height of the main flow passage portion 50a (i.e., the flow passage 50) to precisely be determined. In a plan view of the first principal surface 2a, the main flow passage portion 50a has a first longitudinal direction parallel to the first direction (x direction).

The inlet 51 and the outlet 52 of the flow passage 50 are defined in the cover 4. In the present embodiment, the inlet 51 of the flow passage 50 is defined in the first side surface 4e of the cover 4. The outlet 52 of the flow passage 50 is defined in the second side surface 4f of the cover 4. As illustrated in FIG. 1, the flow passage 50 has the shape of a straight line in the plan view of the first principal surface 2a. The flow passage 50 is formed by the main flow passage portion 50a extending along the first principal surface 2a.

The cover 4 has through holes 46 defined therein. The through holes 46 are provided on both sides of the recessed portion 44 defined in the silicon film 43 in the second direction (y direction). Accordingly, in the plan view of the first principal surface 2a, the first pads 23 and the second pads 24 and 25 are exposed from the cover 4. The through holes 46 enable wires (not illustrated) to be drawn from the first pads 23, and thus make it possible to supply power to the heater 20 from outside the thermal flow sensor 1. The through holes 46 enable wires (not illustrated) to be drawn from the second pads 24 and 25, and thus enable the thermal flow sensor 1 to be connected to a flow computer 55 (see FIG. 6).

Figure 6:
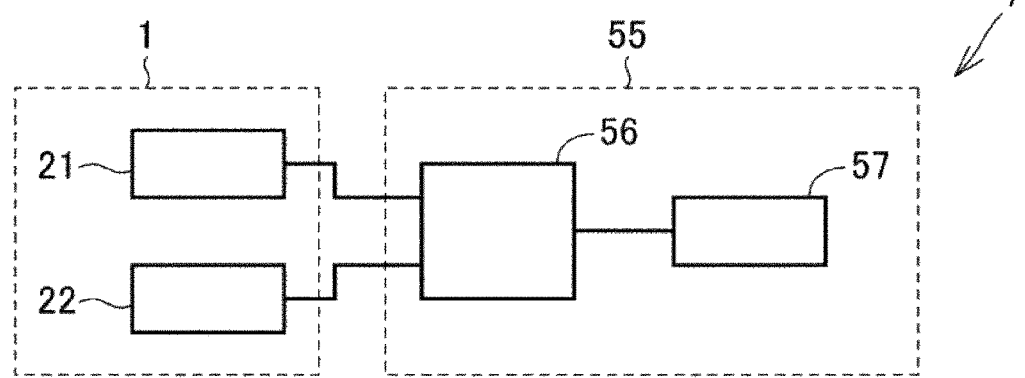
FIG. 6 is a schematic block diagram of a flow sensor system according to the first embodiment.

A flow sensor system 7 according to the first embodiment will be described below with reference to FIG. 6. The flow sensor system 7 includes the thermal flow sensor 1 and the flow computer 55. The flow computer 55 is connected to the thermal flow sensor 1. The flow computer 55 is formed by, for example, a semiconductor processor, such as a central processing unit (CPU). The flow computer 55 includes an output reading unit 56 and a flow calculation unit 57. The output reading unit 56 reads a first output of the first temperature sensor 21 and a second output of the second temperature sensor 22. The flow calculation unit 57 calculates the flow rate of a fluid (a gas or liquid) flowing through the flow passage 50 from the first output of the first temperature sensor 21 and the second output of the second temperature sensor 22. The flow calculation unit 57, for example, calculates a difference between the second output and the first output and calculates the flow rate of the fluid from this difference. The flow rate of the fluid refers to the volume of the fluid that flows through the flow passage 50 per unit time.

Figure 7:
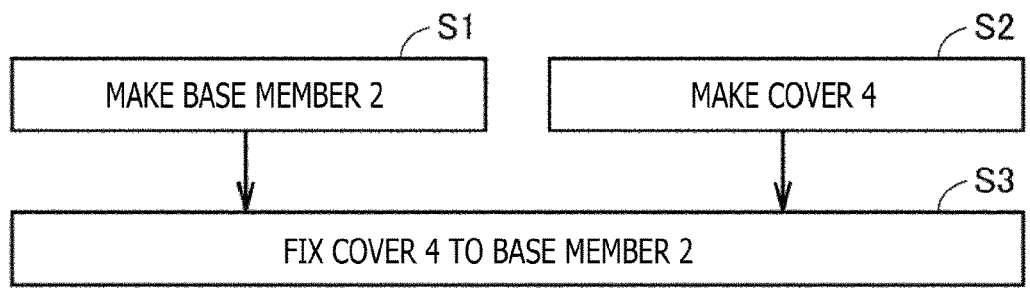
FIG. 7 illustrates a flowchart of a method of manufacturing the thermal flow sensor according to the first embodiment.

An example of a method of manufacturing the thermal flow sensor 1 according to the present embodiment will be described below with reference to FIG. 7. The method of manufacturing the thermal flow sensor 1 according to the present embodiment includes a step (S1) of making the base member 2, a step (S2) of making the cover 4, and a step (S3) of fixing the cover 4 to the base member 2. The step (S1) of making the base member 2 may be performed either before the step (S2) of making the cover 4 or after the step (S2) of making the cover 4. The step (S1) of making the base member 2 may be performed while the step (S2) of making the cover 4 is performed.

An example of the step (S1) of making the base member 2 will be described below with reference to FIGS. 8 to 21.

Figure 8:
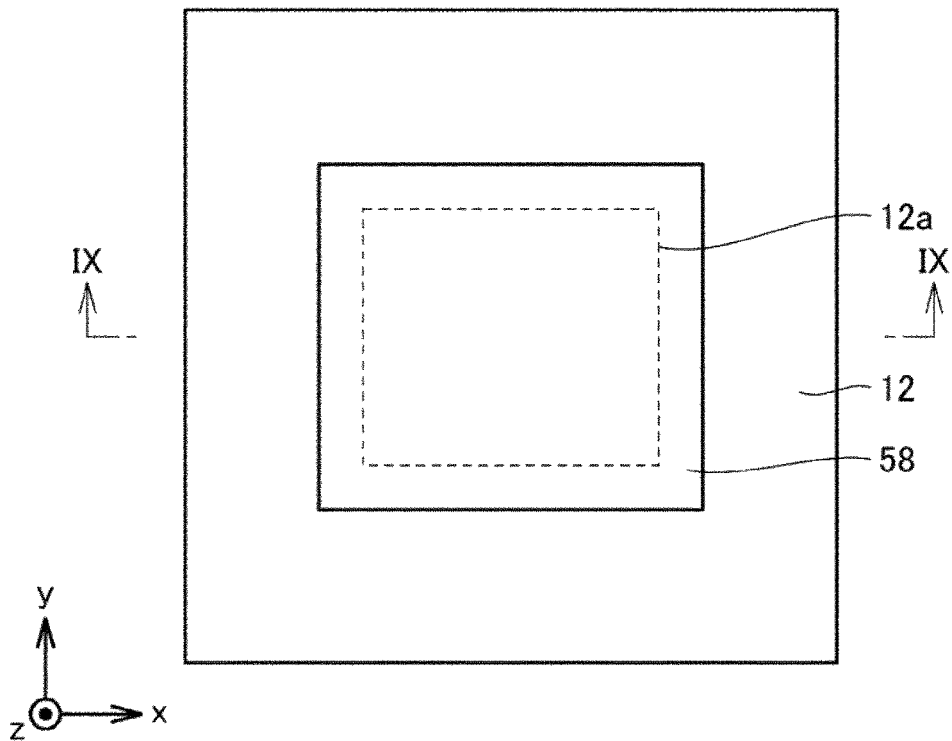
FIG. 8 is a schematic plan view illustrating a step in a step of making a base member in the method of manufacturing the thermal flow sensor according to the first embodiment.
Figure 9:
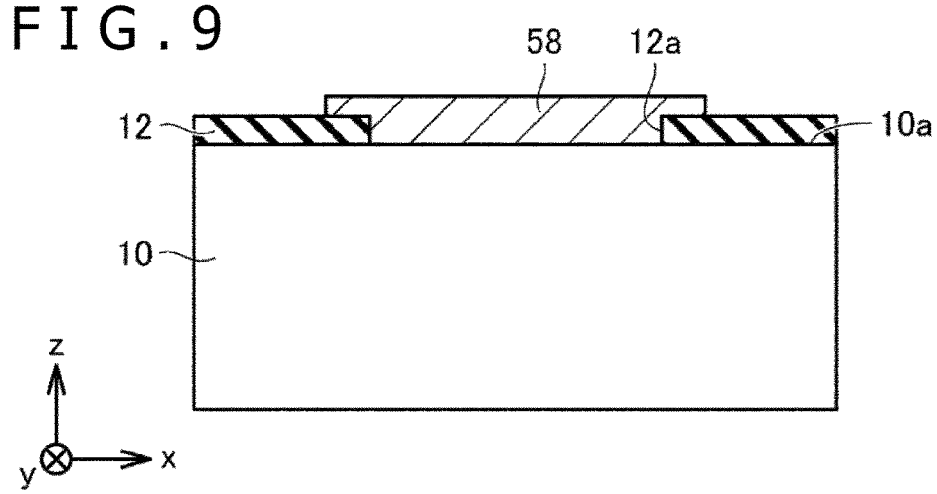
FIG. 9 is a schematic sectional view taken along line IX-IX in FIG. 8, illustrating the step illustrated in FIG. 8 in the step of making the base member in the method of manufacturing the thermal flow sensor according to the first embodiment.

Referring to FIGS. 8 and 9, the third insulating film 12 is formed on the substrate 10. The substrate 10 is, for example, a silicon substrate. The third insulating film 12 is, for example, a silicon dioxide film. The third insulating film 12 is formed by, for example, a chemical vapor deposition (CVD) process. The opening 12a is formed in the third insulating film 12 employing a photolithography process or the like. A sacrificial layer 58 is formed in the opening 12a of the third insulating film 12 and on a portion of a surface of the third insulating film 12. The sacrificial layer 58 is formed by, for example, a polysilicon layer. The sacrificial layer 58 is formed by, for example, a CVD process.

Figure 10:
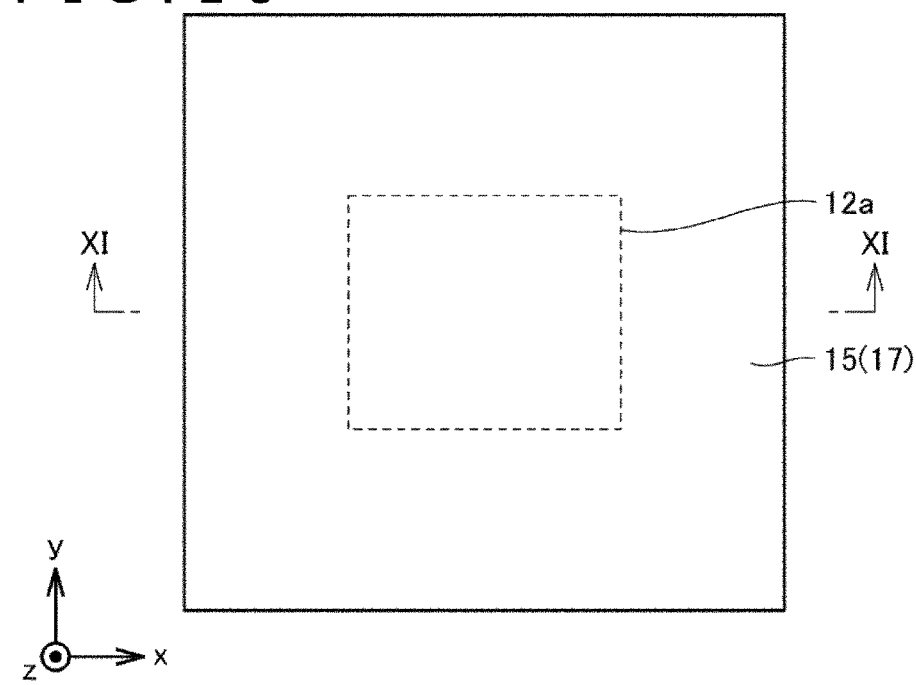
FIG. 10 is a schematic plan view illustrating a step following the step illustrated in FIGS. 8 and 9 in the step of making the base member in the method of manufacturing the thermal flow sensor according to the first embodiment.
Figure 11:
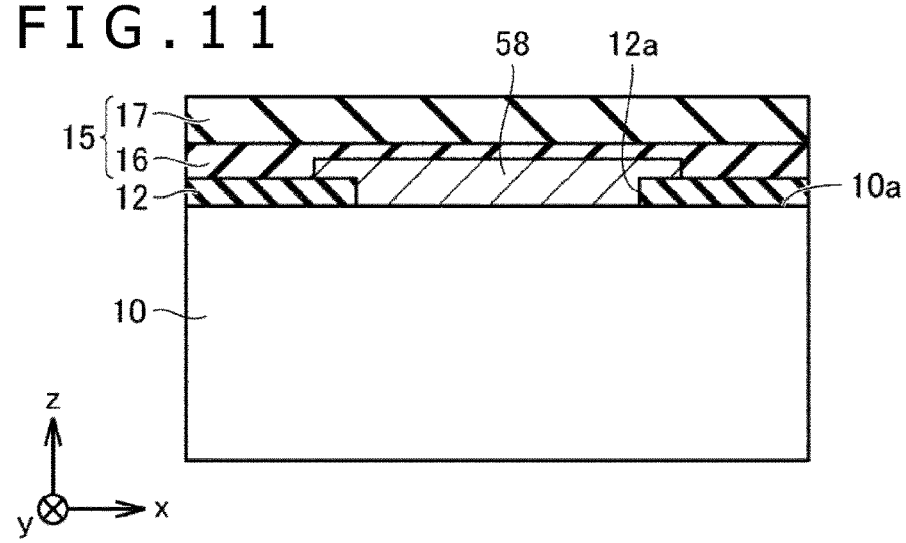
FIG. 11 is a schematic sectional view taken along line XI-XI in FIG. 10, illustrating the step illustrated in FIG. 10 in the step of making the base member in the method of manufacturing the thermal flow sensor according to the first embodiment.

Referring to FIGS. 10 and 11, the first insulating film 15 is formed on the third insulating film 12 and the sacrificial layer 58. The first insulating film 15 includes the first silicon nitride layer 16 and the first silicon dioxide layer 17. More specifically, the first silicon nitride layer 16 is formed on the third insulating film 12 and the sacrificial layer 58. Then, the first silicon dioxide layer 17 is formed on the first silicon nitride layer 16. Each of the first silicon nitride layer 16 and the first silicon dioxide layer 17 is formed by, for example, a CVD process.

Figure 12:
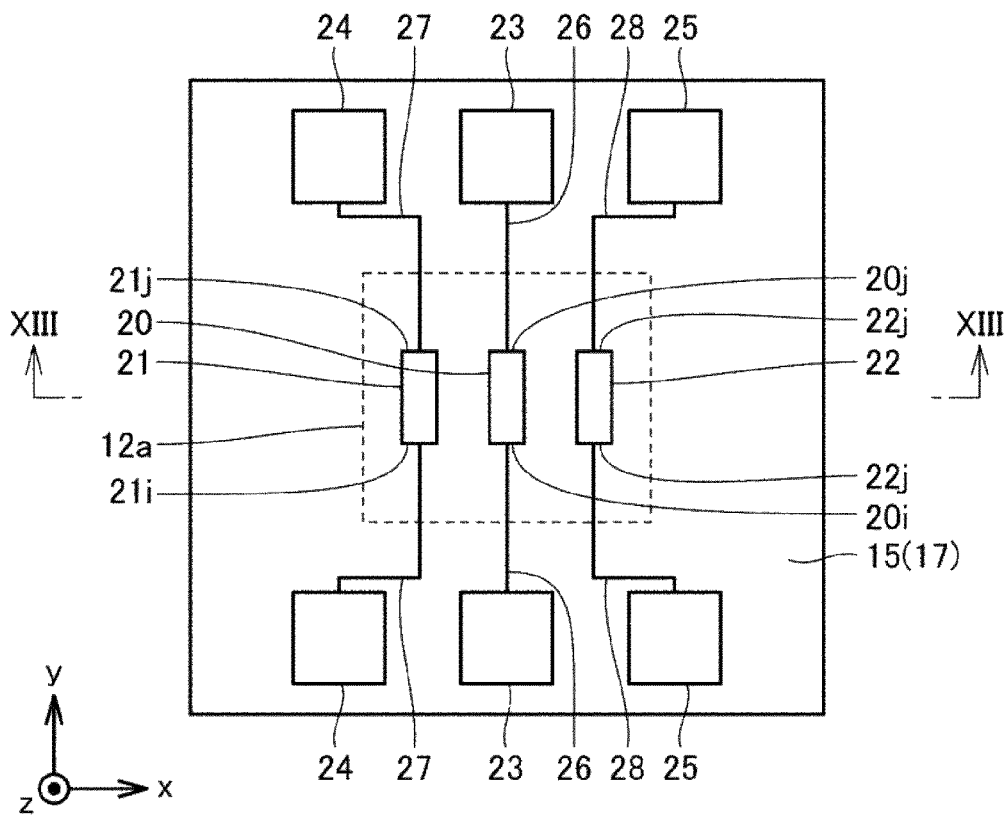
FIG. 12 is a schematic plan view illustrating a step following the step illustrated in FIGS. 10 and 11 in the step of making the base member in the method of manufacturing the thermal flow sensor according to the first embodiment.
Figure 13:
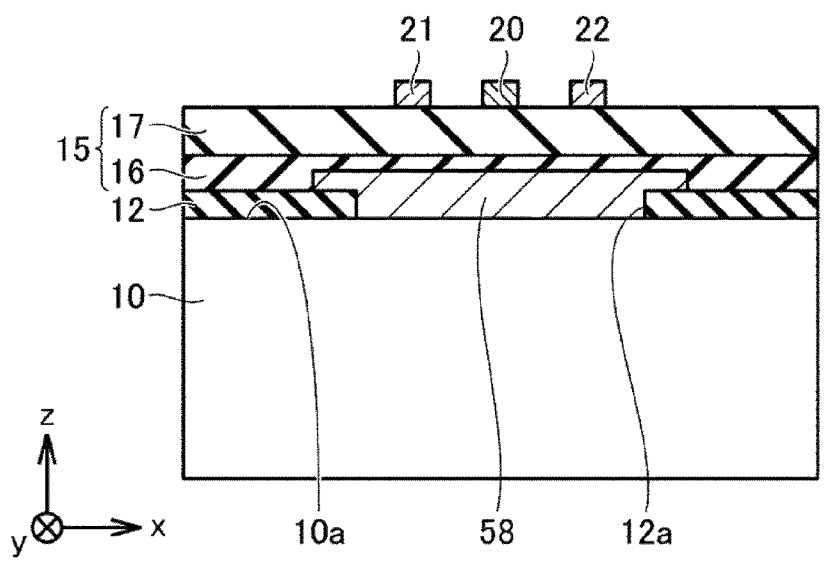
FIG. 13 is a schematic sectional view taken along line XIII-XIII in FIG. 12, illustrating the step illustrated in FIG. 12 in the step of making the base member in the method of manufacturing the thermal flow sensor according to the first embodiment.

Referring to FIGS. 12 and 13, the heater 20, the first temperature sensor 21, the second temperature sensor 22, the first pads 23, the second pads 24 and 25, the first wires 26, and the second wires 27 and 28 are formed on the first insulating film 15 (i.e., the first silicon dioxide layer 17). For example, an electrically conductive layer made of platinum is formed on the first insulating film 15 (i.e., the first silicon dioxide layer 17). The electrically conductive layer is formed by, for example, a vacuum deposition process or a sputtering process. The electrically conductive layer is subjected to patterning employing a photolithography process or the like. As a result, the heater 20, the first temperature sensor 21, the second temperature sensor 22, the first pads 23, the second pads 24 and 25, the first wires 26, and the second wires 27 and 28 are formed on the first insulating film 15 (i.e., the first silicon dioxide layer 17).

Figure 14:
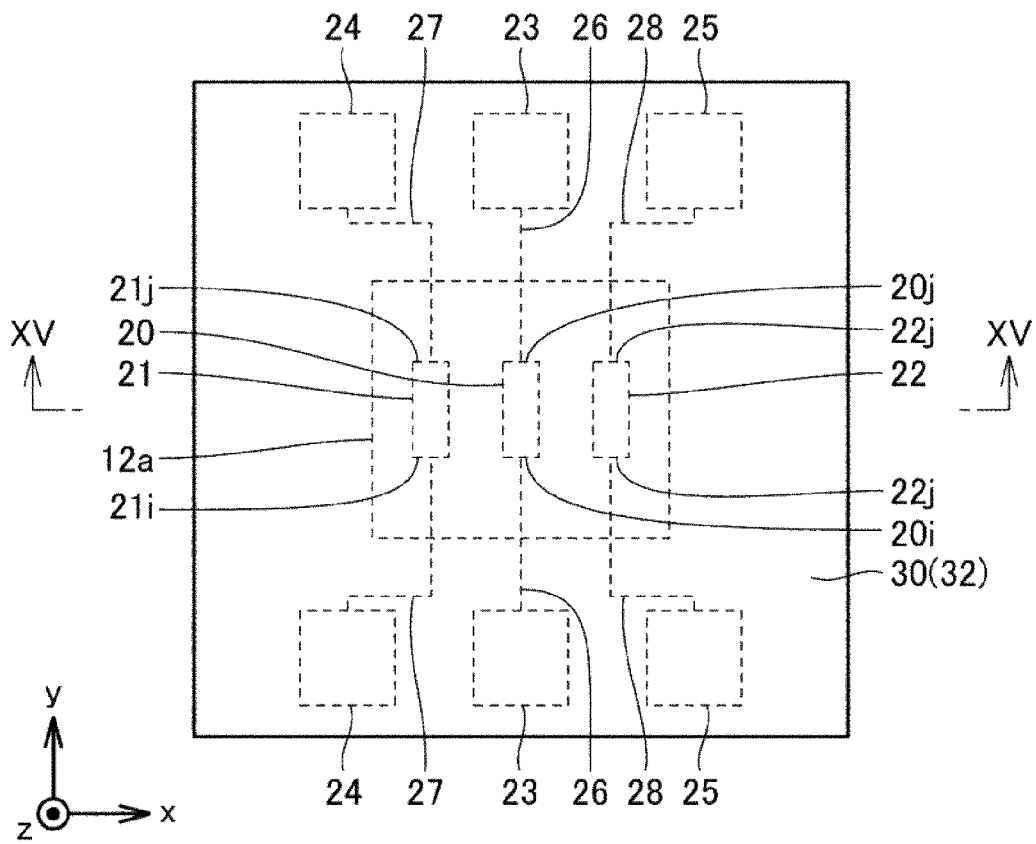
FIG. 14 is a schematic plan view illustrating a step following the step illustrated in FIGS. 12 and 13 in the step of making the base member in the method of manufacturing the thermal flow sensor according to the first embodiment.
Figure 15:
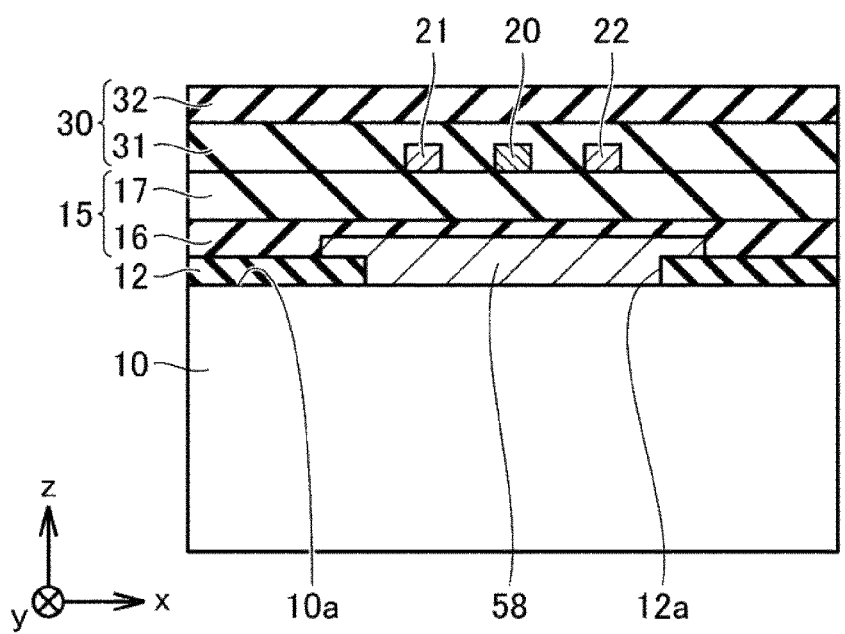
FIG. 15 is a schematic sectional view taken along line XV-XV in FIG. 14, illustrating the step illustrated in FIG. 14 in the step of making the base member in the method of manufacturing the thermal flow sensor according to the first embodiment.

Referring to FIGS. 14 and 15, the second insulating film 30 is formed on the first insulating film 15 (i.e., the first silicon dioxide layer 17). The second insulating film 30 includes the second silicon nitride layer 32 and the second silicon dioxide layer 31. More specifically, the second silicon dioxide layer 31 is formed on the first insulating film 15 (i.e., the first silicon dioxide layer 17). Then, the second silicon nitride layer 32 is formed on the second silicon dioxide layer 31. Each of the second silicon dioxide layer 31 and the second silicon nitride layer 32 is formed by, for example, a CVD process. The second insulating film 30 (i.e., the second silicon dioxide layer 31) covers the heater 20, the first temperature sensor 21, the second temperature sensor 22, the first pads 23, the second pads 24 and 25, the first wires 26, and the second wires 27 and 28.

Figure 16:
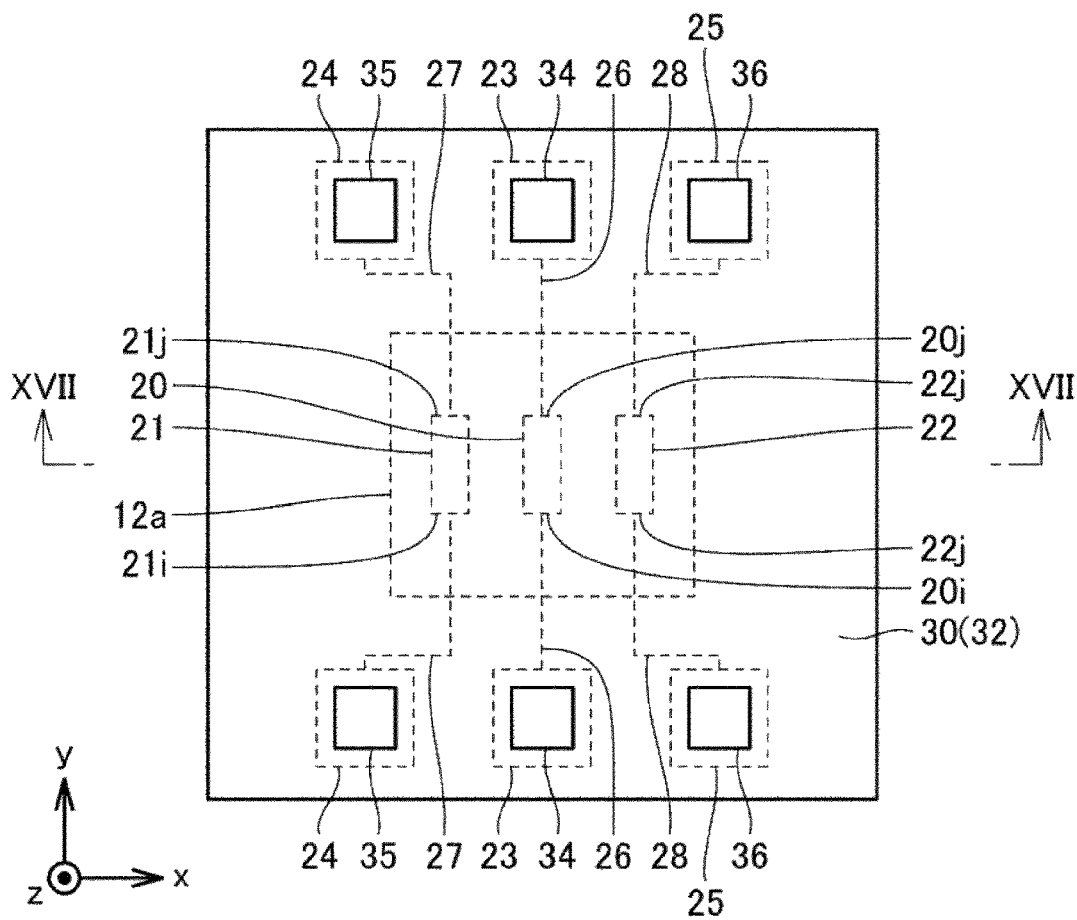
FIG. 16 is a schematic plan view illustrating a step following the step illustrated in FIGS. 14 and 15 in the step of making the base member in the method of manufacturing the thermal flow sensor according to the first embodiment.
Figure 17:
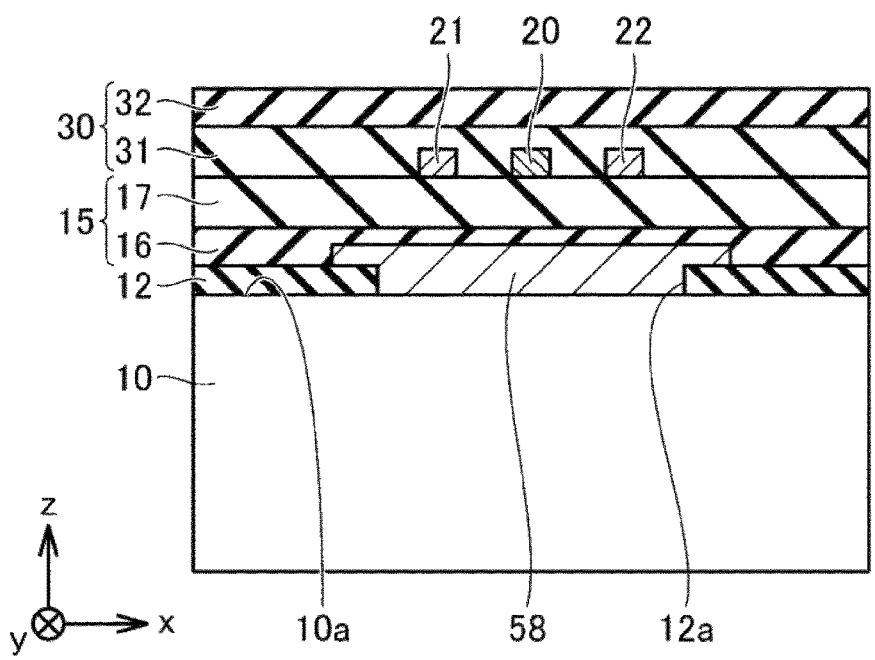
FIG. 17 is a schematic sectional view taken along line XVII-XVII in FIG. 16, illustrating the step illustrated in FIG. 16 in the step of making the base member in the method of manufacturing the thermal flow sensor according to the first embodiment.

Referring to FIGS. 16 and 17, the openings 34, 35, and 36 are formed in the second insulating film 30. For example, the second insulating film 30 is subjected to patterning employing a photolithography process or the like. The second insulating film 30 is subjected to dry etching using an etching gas, such as $CF_4$, for example. Thus, the openings 34, 35, and 36 are formed in the second insulating film 30. The first pads 23 are exposed from the second insulating film 30 through the openings 34 in the second insulating film 30. The second pads 24 are exposed from the second insulating film 30 through the openings 35 in the second insulating film 30. The second pads 25 are exposed from the second insulating film 30 through the openings 36 in the second insulating film 30.

Figure 18:
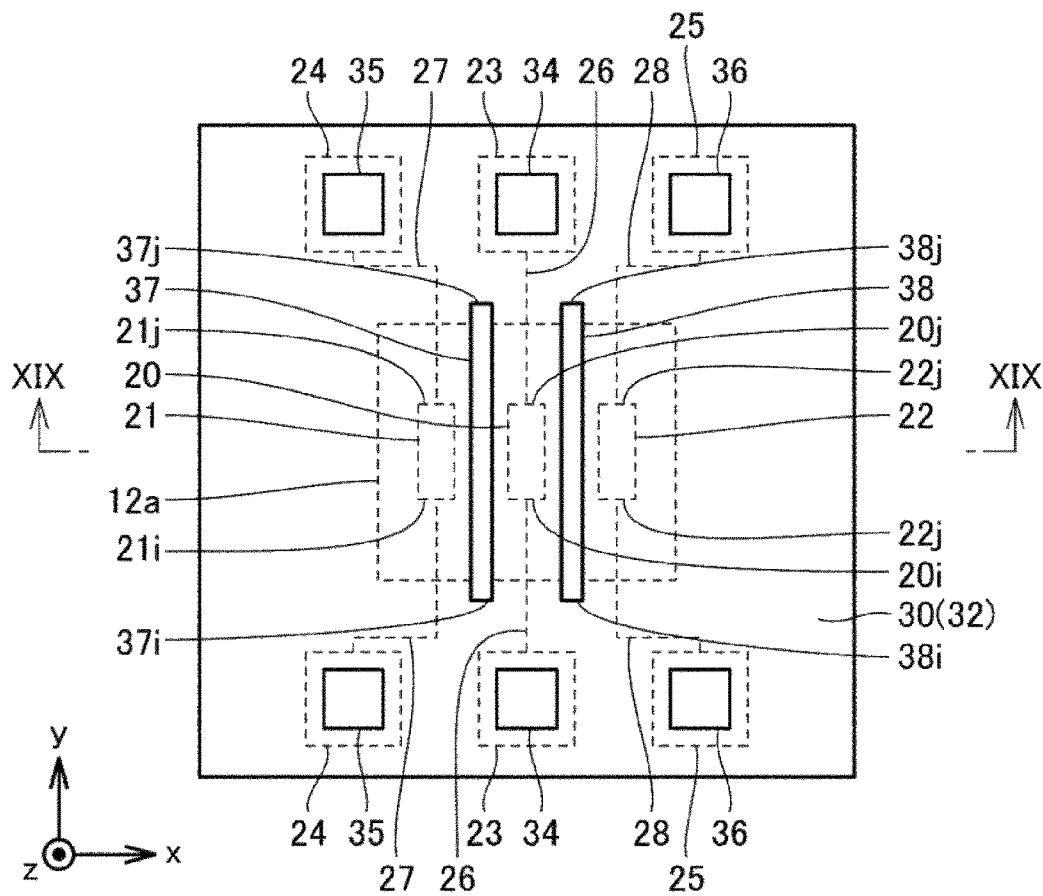
FIG. 18 is a schematic plan view illustrating a step following the step illustrated in FIGS. 16 and 17 in the step of making the base member in the method of manufacturing the thermal flow sensor according to the first embodiment.
Figure 19:
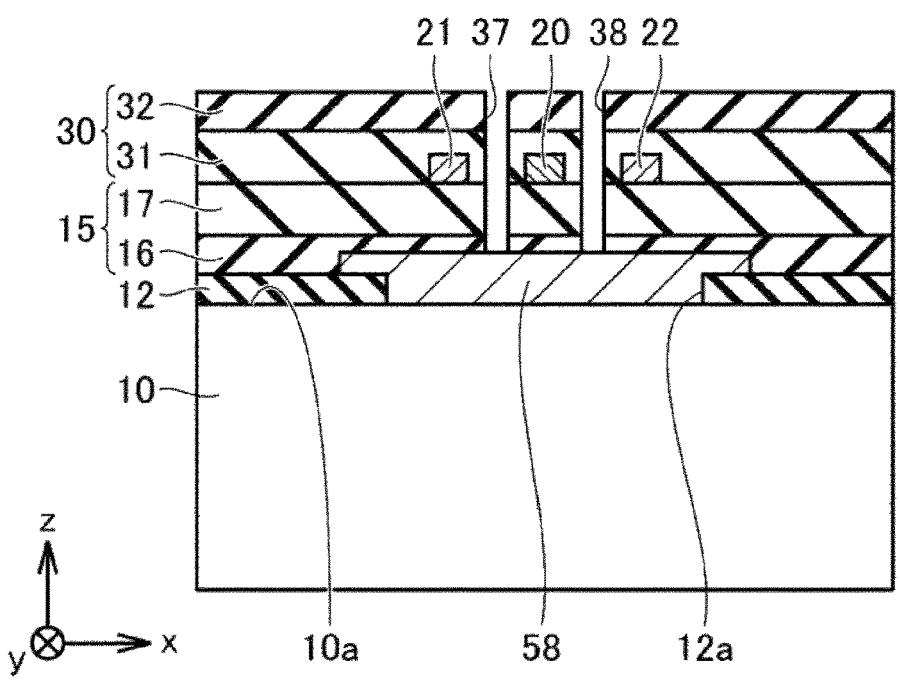
FIG. 19 is a schematic sectional view taken along line XIX-XIX in FIG. 18, illustrating the step illustrated in FIG. 18 in the step of making the base member in the method of manufacturing the thermal flow sensor according to the first embodiment.

Referring to FIGS. 18 and 19, the first slit 37 and the second slit 38 are formed in the first insulating film 15 and the second insulating film 30. For example, the first insulating film 15 and the second insulating film 30 are subjected to patterning employing a photolithography process or the like. The first insulating film 15 and the second insulating film 30 are subjected to dry etching using an etching gas, such as $CF_4$, for example. Thus, the first slit 37 and the second slit 38 are formed in the first insulating film 15 and the second insulating film 30.

Referring to FIGS. 20 and 21, a portion of the substrate 10 and the sacrificial layer 58 are subjected to etching. For example, the portion of the substrate 10 and the sacrificial layer 58 are subjected to selective wet etching using an etchant, such as tetramethylammonium hydroxide (TMAH). The third insulating film 12 serves as an etching mask. Thus, the cavity 11 is formed in the substrate 10 with the sacrificial layer 58 removed. Each of the first slit 37 and the second slit 38 is now in communication with the cavity 11. The base member 2 is thus obtained.

An example of the step (S2) of making the cover 4 will be described below with reference to FIGS. 22 to 33.

Figure 22:
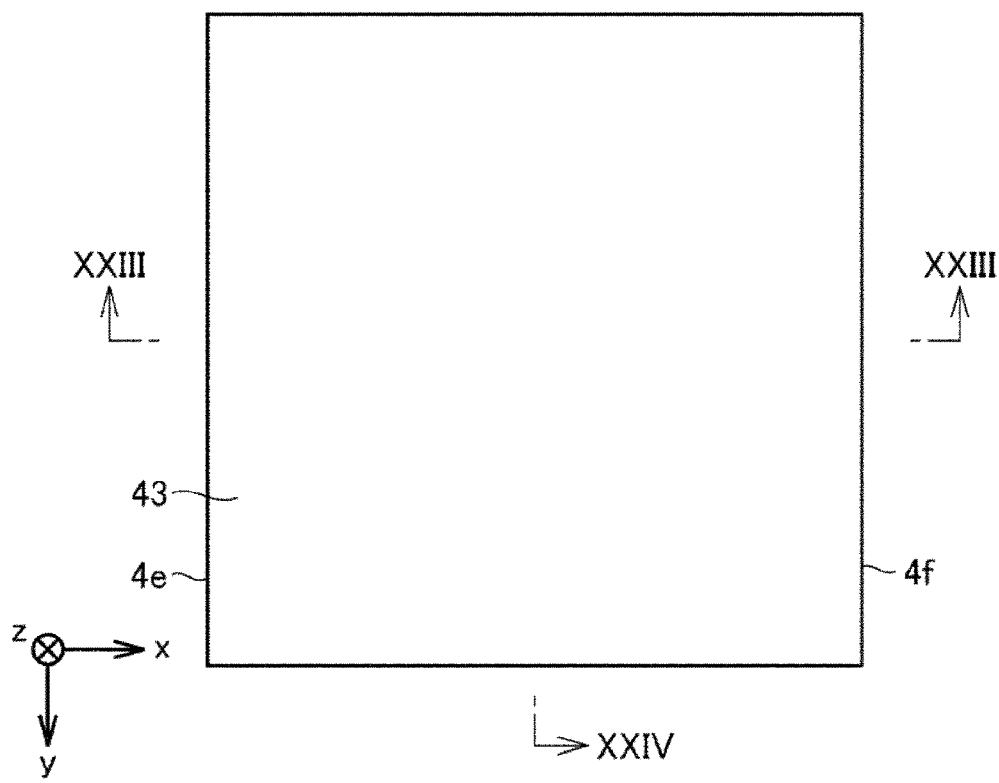
FIG. 22 is a schematic plan view illustrating a step in a step of making a cover in the method of manufacturing the thermal flow sensor according to the first embodiment.
Figure 23:
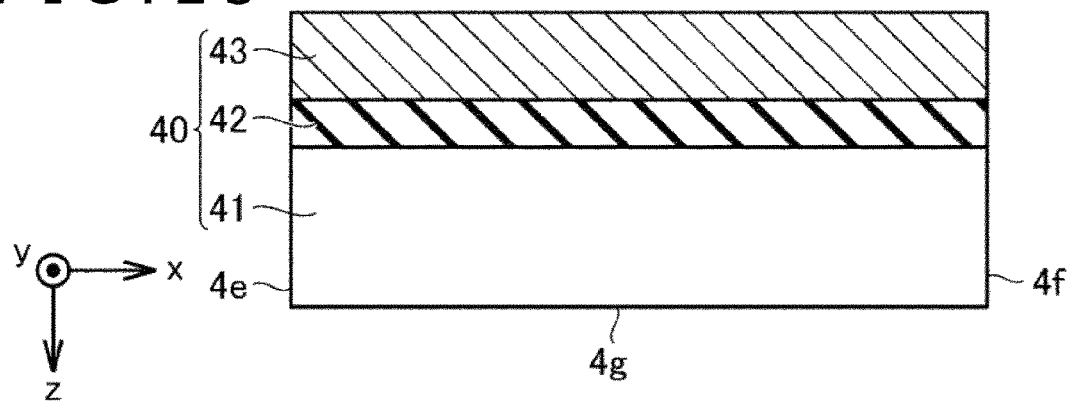
FIG. 23 is a schematic sectional view taken along line XXIII-XXIII in FIG. 22, illustrating the step illustrated in FIG. 22 in the step of making the cover in the method of manufacturing the thermal flow sensor according to the first embodiment.
Figure 24:
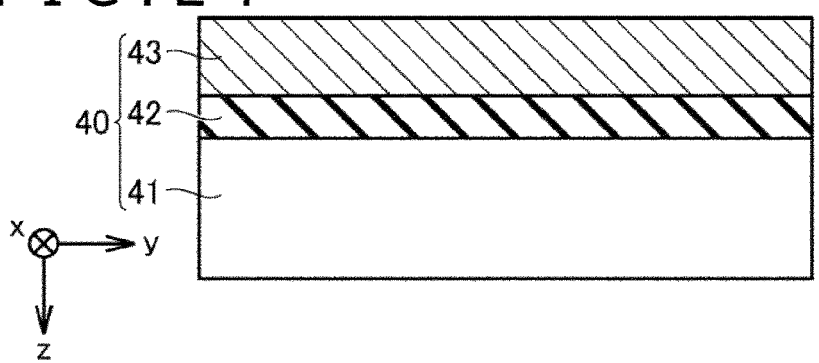
FIG. 24 is a schematic sectional view taken along line XXIV-XXIV in FIG. 22, illustrating the step illustrated in FIG. 22 in the step of making the cover in the method of manufacturing the thermal flow sensor according to the first embodiment.

Referring to FIGS. 22 to 24, the SOI substrate 40 is prepared. The SOI substrate 40 includes the silicon substrate 41, the silicon dioxide film 42 provided on the silicon substrate 41, and the silicon film 43 provided on the silicon dioxide film 42. The silicon dioxide film 42 lies between the silicon substrate 41 and the silicon film 43. The SOI substrate 40 includes the first side surface 4e, the second side surface 4f, and the third principal surface 4g.

Figure 25:
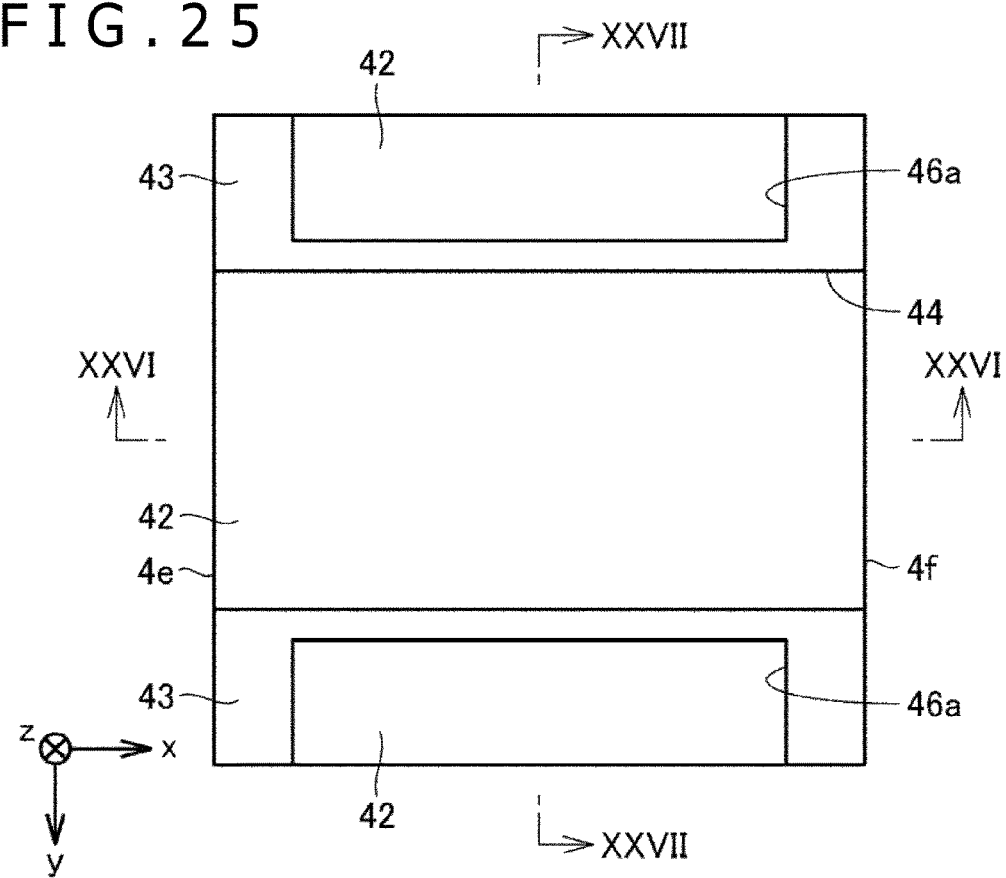
FIG. 25 is a schematic plan view illustrating a step following the step illustrated in FIGS. 22 to 24 in the step of making the cover in the method of manufacturing the thermal flow sensor according to the first embodiment.
Figure 26:
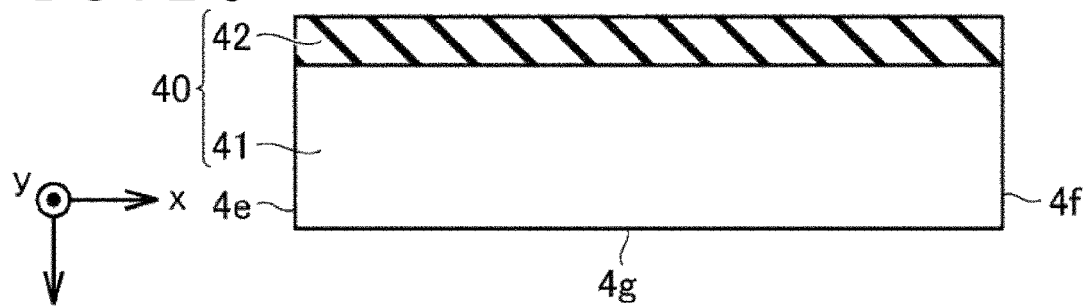
FIG. 26 is a schematic sectional view taken along line XXVI-XXVI in FIG. 25, illustrating the step illustrated in FIG. 25 in the step of making the cover in the method of manufacturing the thermal flow sensor according to the first embodiment.
Figure 27:
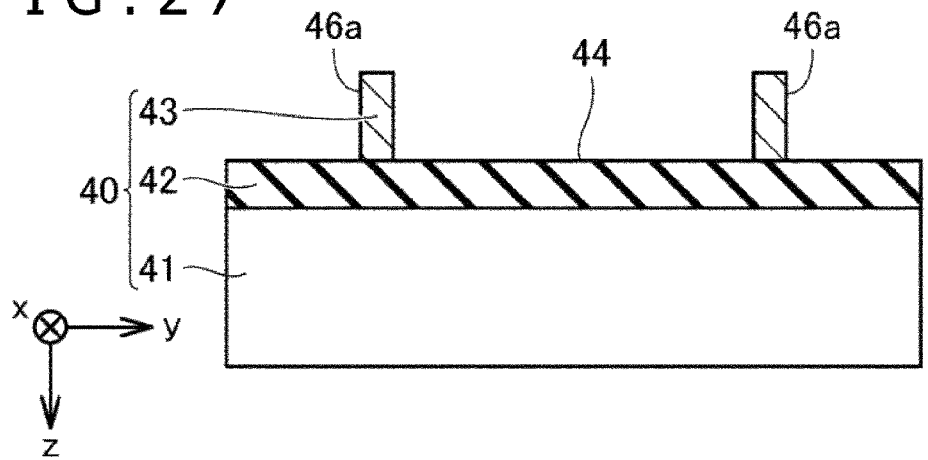
FIG. 27 is a schematic sectional view taken along line XXVII-XXVII in FIG. 25, illustrating the step illustrated in FIG. 25 in the step of making the cover in the method of manufacturing the thermal flow sensor according to the first embodiment.

Referring to FIGS. 25 to 27, portions of the silicon film 43 are removed employing a photolithography process or the like. Specifically, the silicon film 43 is subjected to etching employing a deep reactive-ion etching (DRIE) process, such as the Bosch process. The recessed portion 44 and side recessed portions 46a are formed in the silicon film 43.

The bottom surface of the recessed portion 44 is defined by the exposed surface of the silicon dioxide film 42 which is exposed from the silicon film 43. The side surfaces of the recessed portion 44 are defined by the silicon film 43. The depth of the recessed portion 44 is equal to the thickness of the silicon film 43 of the SOI substrate 40. This allows the depth of the recessed portion 44 to precisely be determined. The recessed portion 44 extends from the first side surface 4e to the second side surface 4f of the SOI substrate 40.

A bottom surface of each side recessed portion 46a is defined by an exposed surface of the silicon dioxide film 42 which is exposed from the silicon film 43. A side surface of the side recessed portion 46a is defined by the silicon film 43. A portion of the silicon film 43 remains between the recessed portion 44 and the side recessed portion 46a. The side recessed portions 46a lie on both sides of the recessed portion 44 in the second direction (y direction). The side recessed portions 46a are formed in portions of the silicon film 43 which correspond to the through holes 46 of the cover 4.

Figure 28:
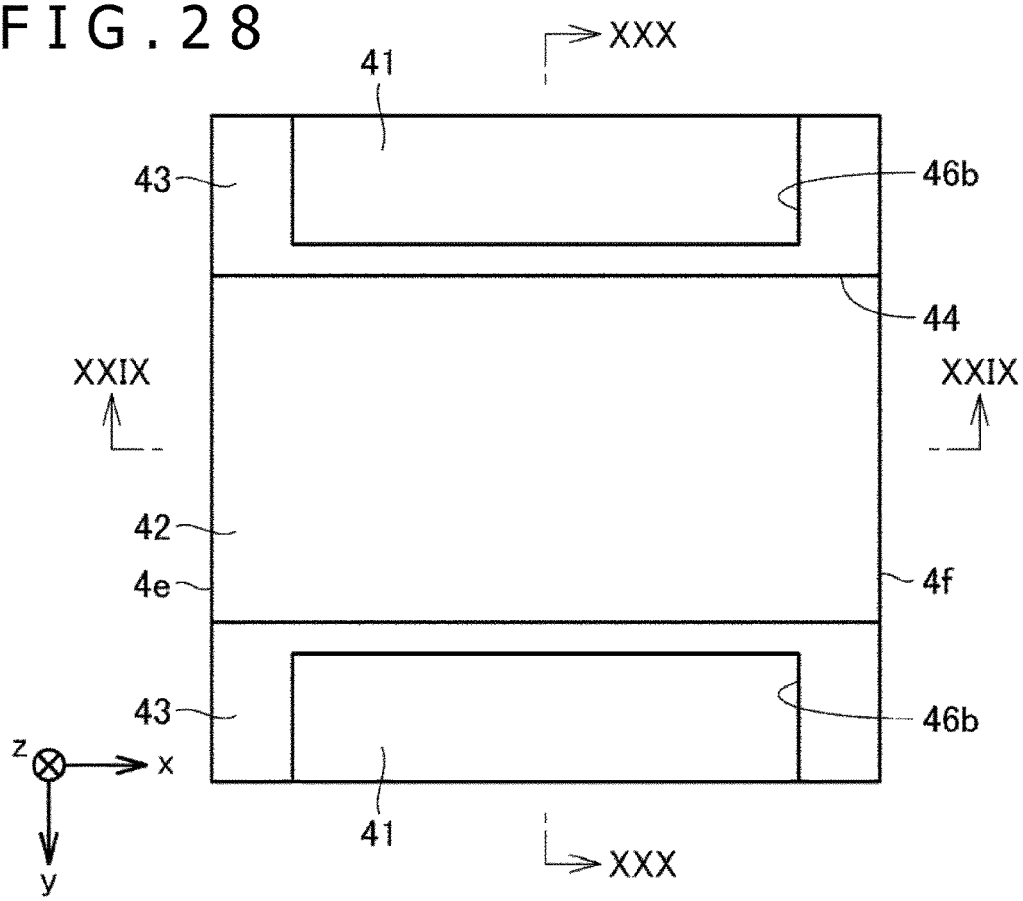
FIG. 28 is a schematic plan view illustrating a step following the step illustrated in FIGS. 25 to 27 in the step of making the cover in the method of manufacturing the thermal flow sensor according to the first embodiment.
Figure 29:
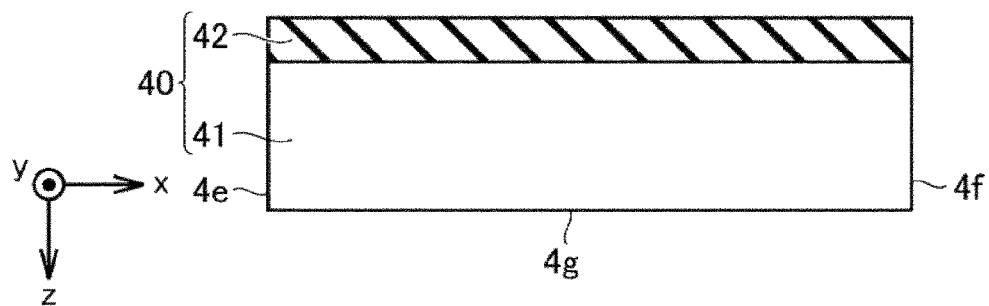
FIG. 29 is a schematic sectional view taken along line XXIX-XXIX in FIG. 28, illustrating the step illustrated in FIG. 28 in the step of making the cover in the method of manufacturing the thermal flow sensor according to the first embodiment.
Figure 30:
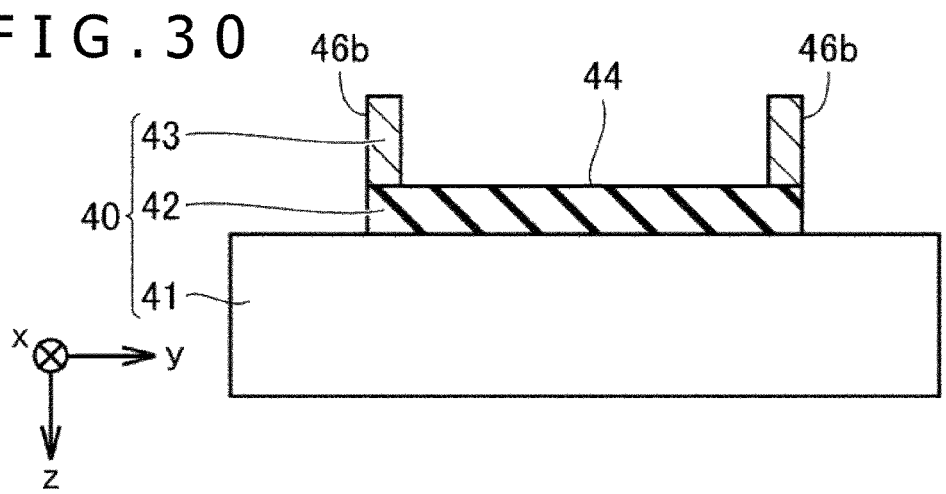
FIG. 30 is a schematic sectional view taken along line XXX-XXX in FIG. 28, illustrating the step illustrated in FIG. 28 in the step of making the cover in the method of manufacturing the thermal flow sensor according to the first embodiment.

Referring to FIGS. 28 to 30, portions of the silicon dioxide film 42 are removed employing a photolithography process or the like. More specifically, portions of the silicon dioxide film 42 which define the bottom surfaces of the side recessed portions 46a are removed. Specifically, the silicon dioxide film 42 is subjected to dry etching using an etching gas, such as $CF_4$, for example. Thus, side recessed portions 46b are formed. A bottom surface of each side recessed portion 46b is defined by a portion of a surface of the silicon substrate 41 which is exposed from the silicon dioxide film 42. A side surface of the side recessed portion 46b is defined by the silicon film 43 and the silicon dioxide film 42.

Figure 31:
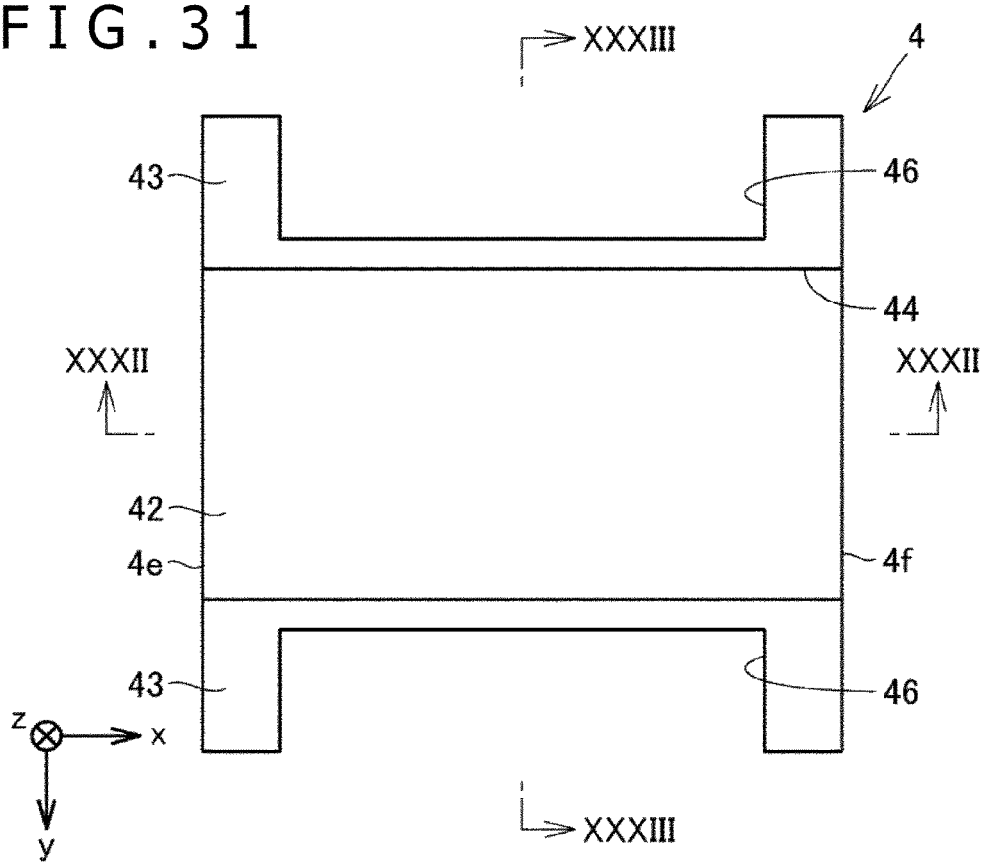
FIG. 31 is a schematic plan view illustrating a step following the step illustrated in FIGS. 28 to 30 in the step of making the cover in the method of manufacturing the thermal flow sensor according to the first embodiment.
Figure 32:
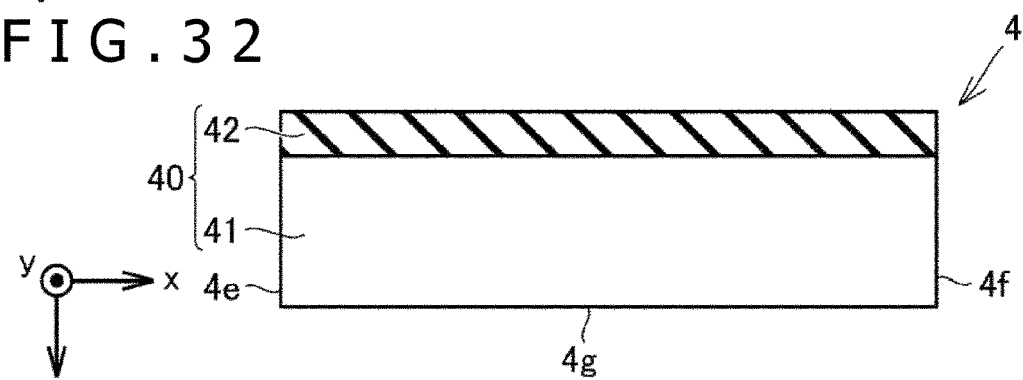
FIG. 32 is a schematic sectional view taken along line XXXII-XXXII in FIG. 31, illustrating the step illustrated in FIG. 31 in the step of making the cover in the method of manufacturing the thermal flow sensor according to the first embodiment.
Figure 33:
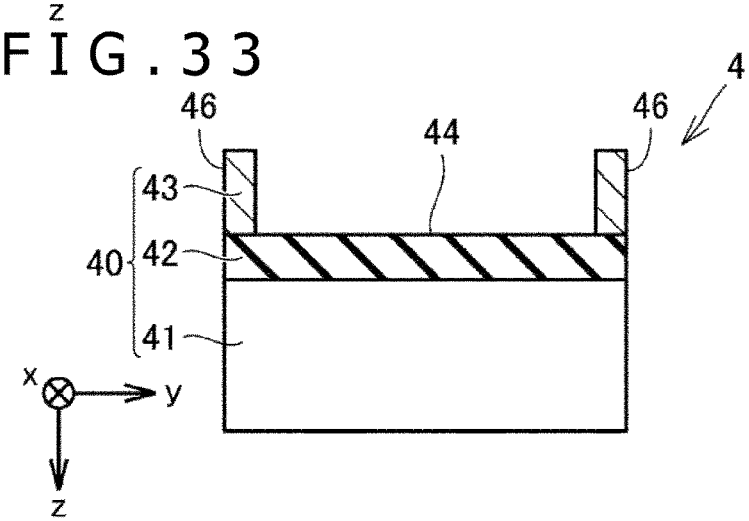
FIG. 33 is a schematic sectional view taken along line XXXIII-XXXIII in FIG. 31, illustrating the step illustrated in FIG. 31 in the step of making the cover in the method of manufacturing the thermal flow sensor according to the first embodiment.

Referring to FIGS. 31 to 33, portions of the silicon substrate 41 are removed employing a photolithography process or the like. More specifically, portions of the silicon substrate 41 which define the bottom surfaces of the side recessed portions 46b are removed. Specifically, the silicon substrate 41 is subjected to etching employing a deep reactive-ion etching (DRIE) process, such as the Bosch process. The through holes 46 are formed in the cover 4. Thus, the cover 4 is obtained.

In the step (S3) of fixing the cover 4 to the base member 2, the cover 4 is fixed to the first principal surface 2a of the base member 2. The cover 4 is joined to the first principal surface 2a of the base member 2 using the joining member (not illustrated), such as the adhesive, for example. Thus, the main flow passage portion 50a, which extends along the first principal surface 2a, of the flow passage 50 is formed. The main flow passage portion 50a is defined by the exposed surface of the silicon dioxide film 42 which defines the bottom surface of the recessed portion 44, the portions of the silicon film 43 which define the side surfaces of the recessed portion 44, and the first principal surface 2a. The first longitudinal direction of the main flow passage portion 50a is parallel to the first direction (x direction) in the plan view of the first principal surface 2a. Thus, the thermal flow sensor 1 is obtained.

Several modifications of the present embodiment will be described below.

In a first modification of the present embodiment, the second temperature sensor 22, the second pads 25, and the second wires 28 are omitted. The output reading unit 56 (see FIG. 6) reads a first output of the first temperature sensor 21 when a fluid is not flowing through the flow passage 50 (i.e., the main flow passage portion 50a) and a second output of the first temperature sensor 21 when the fluid is flowing through the flow passage 50 (i.e., the main flow passage portion 50a). The flow calculation unit 57 (see FIG. 6) calculates the flow rate of the fluid flowing through the flow passage 50 from the first output and the second output of the first temperature sensor 21. The flow calculation unit 57, for example, calculates a difference between the second output and the first output and calculates the flow rate of the fluid from this difference.

In a second modification of the present embodiment, the first temperature sensor 21, the second pads 24, and the second wires 27 are omitted. The output reading unit 56 (see FIG. 6) reads a first output of the second temperature sensor 22 when a fluid is not flowing through the flow passage 50 (i.e., the main flow passage portion 50a) and a second output of the second temperature sensor 22 when the fluid is flowing through the flow passage 50 (i.e., the main flow passage portion 50a). The flow calculation unit 57 (see FIG. 6) calculates the flow rate of the fluid flowing through the flow passage 50 from the first output and the second output of the second temperature sensor 22. The flow calculation unit 57, for example, calculates a difference between the second output and the first output and calculates the flow rate of the fluid from this difference.

In a third modification of the present embodiment, the first temperature sensor 21, the second temperature sensor 22, the second pads 24 and 25, and the second wires 27 and 28 are omitted. The output reading unit 56 (see FIG. 6) reads a first temperature of the heater 20 when a fluid is not flowing through the flow passage 50 (i.e., the main flow passage portion 50a) and a second temperature of the heater 20 when the fluid is flowing through the flow passage 50 (i.e., the main flow passage portion 50a). The flow calculation unit 57 (see FIG. 6) calculates the flow rate of the fluid flowing through the flow passage 50 from the first temperature and the second temperature. The flow calculation unit 57, for example, calculates a difference between the second temperature and the first temperature and calculates the flow rate of the fluid from this difference.

In a fourth modification of the present embodiment, the second insulating film 30 is omitted, and the heater 20, the first temperature sensor 21, and the second temperature sensor 22 may be exposed in the flow passage 50 (i.e., the main flow passage portion 50a). In a fifth modification of the present embodiment, at least one of the first slit 37 or the second slit 38 may be omitted.

Effects of the thermal flow sensor 1 according to the present embodiment will be described below.

The thermal flow sensor 1 according to the present embodiment includes the base member 2 and the cover 4. The base member 2 includes the first principal surface 2a extending in the first direction (x direction) and the second direction (y direction) perpendicular to the first direction (x direction). The base member 2 includes the heater 20. The cover 4 is fixed to the first principal surface 2a of the base member 2. The cover 4 is formed by the SOI substrate 40 including the silicon substrate 41, the silicon dioxide film 42 provided on the silicon substrate 41, and the silicon film 43 provided on the silicon dioxide film 42. The silicon film 43 has the recessed portion 44 defined therein. The bottom surface of the recessed portion 44 is defined by the exposed surface of the silicon dioxide film 42 which is exposed from the silicon film 43. The side surfaces of the recessed portion 44 are defined by the silicon film 43. The main flow passage portion 50a, which is the portion of the flow passage 50 which extends along the first principal surface 2a, is defined by the exposed surface of the silicon dioxide film 42 which defines the bottom surface of the recessed portion 44, the portions of the silicon film 43 which define the side surfaces of the recessed portion 44, and the first principal surface 2a. The first longitudinal direction of the main flow passage portion 50a is parallel to the first direction (x direction) in the plan view of the first principal surface 2a. The inlet 51 and the outlet 52 of the flow passage 50 are defined in the cover 4. The heater 20 is opposed to the main flow passage portion 50a in the third direction (z direction) perpendicular to both the first direction (x direction) and the second direction (y direction).

In the thermal flow sensor 1, the height of the main flow passage portion 50a (i.e., the flow passage 50) is determined by the thickness of the silicon film 43 of the SOI substrate 40. The height of the main flow passage portion 50a (i.e., the flow passage 50) can precisely be determined. Thus, the thermal flow sensor 1 is able to measure the flow rate of the fluid with improved precision.

Moreover, the SOI substrate 40 is typically subjected to patterning employing a process that provides high precision in patterning, such as a photolithography process. Accordingly, the width of the main flow passage portion 50a (i.e., the flow passage 50) can also be precisely determined. The thermal flow sensor 1 is thus able to measure the flow rate of the fluid with improved precision.

In the thermal flow sensor 1 according to the present embodiment, the base member 2 further includes the substrate 10 and the first insulating film 15. The substrate 10 includes the second principal surface 10a. The first insulating film 15 is provided on the second principal surface 10a of the substrate 10. The heater 20 is provided on the first insulating film 15. The first insulating film 15 is arranged between the heater 20 and the substrate 10. Accordingly, not only an insulating substrate but also an electrically conductive substrate or a semiconductor substrate can be used as the substrate 10.

In the thermal flow sensor 1 according to the present embodiment, the base member 2 further includes at least one of the first temperature sensor 21 or the second temperature sensor 22. The at least one of the first temperature sensor 21 or the second temperature sensor 22 is provided on the first insulating film 15. The first temperature sensor 21 is disposed closer to the inlet 51 of the flow passage 50 than is the heater 20. The second temperature sensor 22 is disposed closer to the outlet 52 of the flow passage 50 than is the heater 20. The at least one of the first temperature sensor 21 or the second temperature sensor 22 is opposed to the main flow passage portion 50a in the third direction (z direction). Thus, the thermal flow sensor 1 is able to measure the flow rate of the fluid with improved precision, using the at least one of the first temperature sensor 21 or the second temperature sensor 22.

In the thermal flow sensor 1 according to the present embodiment, at least one of the first slit 37 or the second slit 38 is defined in the first insulating film 15. The at least one of the first slit 37 or the second slit 38 has a second longitudinal direction parallel to the second direction (y direction). The first slit 37 is provided between the heater 20 and the first temperature sensor 21. The second slit 38 is provided between the heater 20 and the second temperature sensor 22.

The at least one of the first slit 37 or the second slit 38 serves to prevent heat from being transferred from the heater 20 to at least one of the first temperature sensor 21 or the second temperature sensor 22. Accordingly, the thermal flow sensor 1 is able to measure the flow rate of the fluid with improved precision, using at least one of the first temperature sensor 21 or the second temperature sensor 22.

In the thermal flow sensor 1 according to the present embodiment, first opposite ends (i.e., the ends 37i and 37j and/or the ends 38i and 38j) of at least one of the first slit 37 or the second slit 38 in the second direction (y direction) are more distant from the center line 50p of the main flow passage portion 50a in the second direction (y direction) than are second opposite ends (i.e., the ends 20i and 20j) of the heater 20 in the second direction (y direction).

The at least one of the first slit 37 or the second slit 38 is thus able to more effectively prevent heat from being transferred from the heater 20 to at least one of the first temperature sensor 21 or the second temperature sensor 22. Accordingly, the thermal flow sensor 1 is able to measure the flow rate of the fluid with improved precision, using at least one of the first temperature sensor 21 or the second temperature sensor 22.

In the thermal flow sensor 1 according to the present embodiment, the cavity 11 is provided at a portion of the substrate 10 which corresponds to the heater 20 and at least one of the first temperature sensor 21 or the second temperature sensor 22. The opening portion 11a of the cavity 11 is defined in the second principal surface 10a of the substrate 10. The cavity 11 is in communication with at least one of the first slit 37 or the second slit 38.

The cavity 11 serves to prevent heat from being dissipated from the heater 20 to the substrate 10. Accordingly, the thermal flow sensor 1 is able to measure the flow rate of the fluid with improved precision, using at least one of the first temperature sensor 21 or the second temperature sensor 22.

In the thermal flow sensor 1 according to the present embodiment, the first opposite ends (i.e., the ends 37i and 37j and/or the ends 38i and 38j) of at least one of the first slit 37 or the second slit 38 in the second direction (y direction) are more distant from the center line 50p of the main flow passage portion 50a in the second direction (y direction) than are the opposite edges (i.e., the edges 11i and 11j) of the opening portion 11a of the cavity 11 in the second direction (y direction).

The at least one of the first slit 37 or the second slit 38 is thus able to more effectively prevent heat from being transferred from the heater 20 to at least one of the first temperature sensor 21 or the second temperature sensor 22. Accordingly, the thermal flow sensor 1 is able to measure the flow rate of the fluid with improved precision, using at least one of the first temperature sensor 21 or the second temperature sensor 22.

In the thermal flow sensor 1 according to the present embodiment, the first insulating film 15 includes the first silicon dioxide layer 17 and the first silicon nitride layer 16. The first ratio of the second thickness $d_2$ of the first silicon dioxide layer 17 to the first thickness $d_1$ of the first silicon nitride layer 16 is greater than 1.0 and equal to or smaller than 5.5.

This leads to reducing or preventing a bending of the first insulating film 15, and reducing or preventing a change in the shape of the main flow passage portion 50a (i.e., the flow passage 50) (in particular, the cross-sectional shape of the main flow passage portion 50a (i.e., the flow passage 50) in a cross-section perpendicular to the first direction (x direction)). The thermal flow sensor 1 is thus able to measure the flow rate of the fluid with improved precision.

In the thermal flow sensor 1 according to the present embodiment, the base member 2 further includes the second insulating film 30 covering the heater 20. Thus, the second insulating film 30 protects the heater 20 from the fluid flowing through the main flow passage portion 50a (i.e., the flow passage 50). The thermal flow sensor 1 is thus able to measure the flow rate of the fluid with improved precision.

In the thermal flow sensor 1 according to the present embodiment, the base member 2 further includes the second insulating film 30 covering the heater 20. The at least one of the first slit 37 or the second slit 38 is defined in the first insulating film 15 and the second insulating film 30.

The at least one of the first slit 37 or the second slit 38 is able to more effectively prevent heat from being transferred from the heater 20 to at least one of the first temperature sensor 21 or the second temperature sensor 22. Accordingly, the thermal flow sensor 1 is able to measure the flow rate of the fluid with improved precision, using at least one of the first temperature sensor 21 or the second temperature sensor 22.

In the thermal flow sensor 1 according to the present embodiment, the second insulating film 30 includes the second silicon dioxide layer 31 and the second silicon nitride layer 32. The second ratio of the fourth thickness $d_4$ of the second silicon dioxide layer 31 to the third thickness $d_3$ of the second silicon nitride layer 32 is greater than 1.0 and equal to or smaller than 5.5.

This leads to reducing or preventing a bending of the second insulating film 30, and reducing or preventing a change in the shape of the main flow passage portion 50a (i.e., the flow passage 50) (in particular, the cross-sectional shape of the main flow passage portion 50a (i.e., the flow passage 50) in a cross-section perpendicular to the first direction (x direction)). The thermal flow sensor 1 is thus able to measure the flow rate of the fluid with improved precision.

In the thermal flow sensor 1 according to the present embodiment, the base member 2 further includes the first pads 23 and the first wires 26. Each first wire 26 is connected to the heater 20 and the corresponding first pad 23. In the plan view of the first principal surface 2a, the first pads 23 are exposed from the cover 4. This allows power to easily be supplied to the heater 20 from outside the thermal flow sensor 1.

In the thermal flow sensor 1 according to the present embodiment, the base member 2 further includes the first pads 23, the second pads 24 and/or 25, the first wires 26, and the second wires 27 and/or 28. Each first wire 26 is connected to the heater 20 and the corresponding first pad 23. The second wires 27 and/or 28 are connected to the at least one of the first temperature sensor 21 or the second temperature sensor 22 and to the corresponding second pads 24 and/or 25. In the plan view of the first principal surface 2a, the first pads 23 and the second pads 24 and/or 25 are exposed from the cover 4.

This allows power to easily be supplied to the heater 20 from outside the thermal flow sensor 1, and makes it easier to take an output from at least one of the first temperature sensor 21 or the second temperature sensor 22 out of the thermal flow sensor 1.

In the thermal flow sensor 1 according to the present embodiment, the cover 4 includes the first side surface 4e and the second side surface 4f that define the opposite end surfaces of the cover 4 in the first direction (x direction). The inlet 51 of the flow passage 50 is defined in the first side surface 4e of the cover 4. The outlet 52 of the flow passage 50 is defined in the second side surface 4f of the cover 4. In the plan view of the first principal surface 2a, the flow passage 50 has the shape of a straight line.

The straight shape of the flow passage 50 contributes to reducing a disturbance in the fluid flowing through the flow passage 50. The thermal flow sensor 1 is thus able to measure the flow rate of the fluid with improved precision.

Second Embodiment

Figure 34:
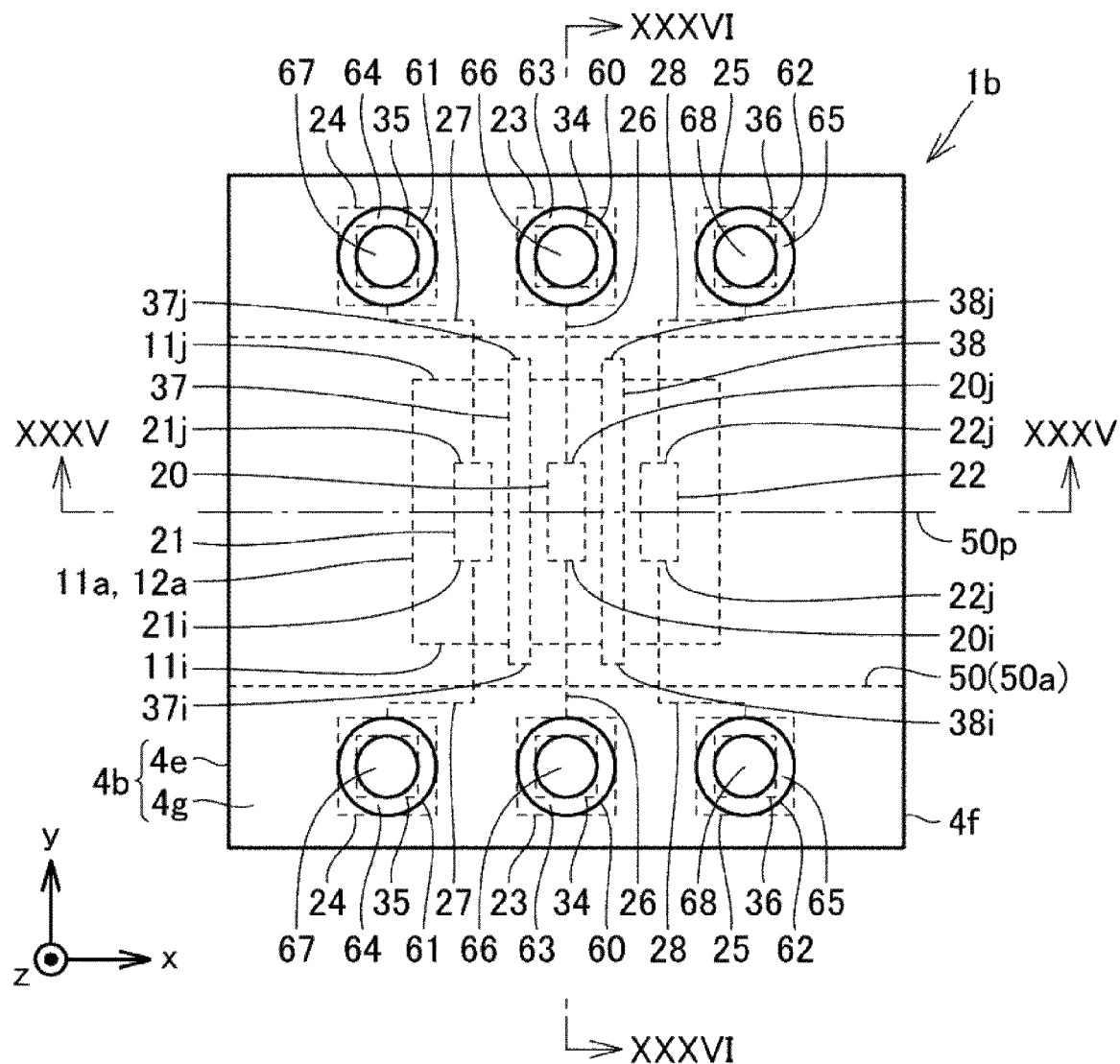
FIG. 34 is a schematic plan view of a thermal flow sensor according to a second embodiment of the present disclosure.
Figure 35:
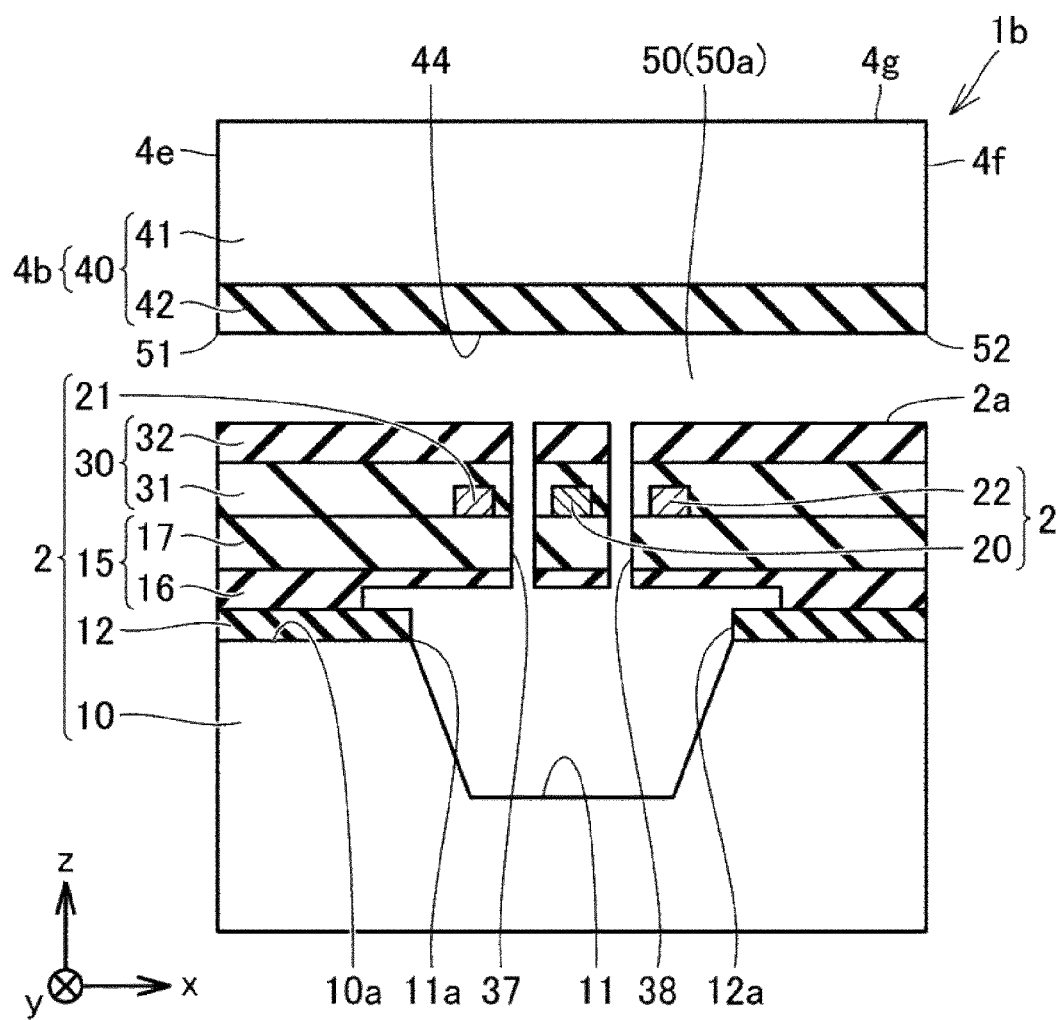
FIG. 35 is a schematic sectional view of the thermal flow sensor according to the second embodiment taken along line XXXV-XXXV in FIG. 34.
Figure 36:
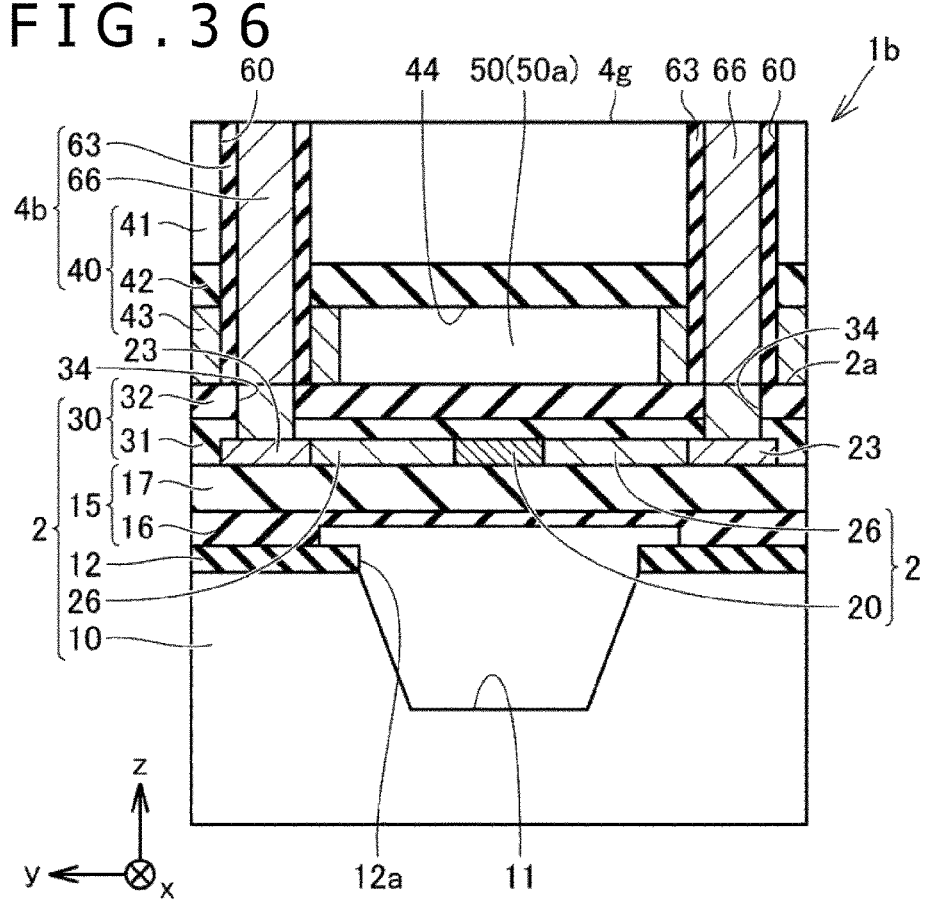
FIG. 36 is a schematic sectional view of the thermal flow sensor according to the second embodiment taken along line XXXVI-XXXVI in FIG. 34.

With reference to FIGS. 34, 35, and 36, a thermal flow sensor 1b according to a second embodiment of the present disclosure will be described. The thermal flow sensor 1b according to the present embodiment is similar in structure to the thermal flow sensor 1 according to the first embodiment, but is different from the thermal flow sensor 1 primarily in the following respects.

The thermal flow sensor 1b includes a cover 4b in place of the cover 4 according to the first embodiment. The cover 4b further includes first through electrodes 66 and second through electrodes 67 and 68. Each first through electrode 66 passes through the cover 4b in the third direction (z direction) and is electrically connected to a corresponding one of first pads 23. Each of the second through electrodes 67 and 68 passes through the cover 4b in the third direction (z direction) and is electrically connected to a corresponding one of second pads 24 and 25.

More specifically, the cover 4b has defined therein through holes 60, 61, and 62 in place of the through holes 46 (see FIGS. 1 and 3). The through holes 60, 61, and 62 are provided on both sides of a recessed portion 44 defined in a silicon film 43 in the second direction (y direction). The through holes 60 are provided for the first pads 23. The through holes 61 are provided for the second pads 24. The through holes 62 are provided for the second pads 25.

An insulating film 63 is provided on a surface of each through hole 60. An insulating film 64 is provided on a surface of each through hole 61. An insulating film 65 is provided on a surface of each through hole 62. Each of the insulating films 63, 64, and 65 is formed by, for example, a silicon dioxide film 42.

The first through electrodes 66 are provided in the through holes 60. More specifically, the first through electrodes 66 are filled in holes defined by the insulating films 63. A side surface of each first through electrode 66 is covered by the corresponding insulating film 63. The first through electrode 66 is electrically insulated from a silicon substrate 41 and the silicon film 43 by the insulating film 63.

The second through electrodes 67 are provided in the through holes 61. More specifically, the second through electrodes 67 are filled in holes defined by the insulating films 64. A side surface of each second through electrode 67 is covered by the corresponding insulating film 64. The second through electrode 67 is electrically insulated from the silicon substrate 41 and the silicon film 43 by the insulating film 64. The second through electrodes 68 are provided in the through holes 62. More specifically, the second through electrodes 68 are filled in holes defined by the insulating films 65. A side surface of each second through electrode 68 is covered by the corresponding insulating film 65. The second through electrode 68 is electrically insulated from the silicon substrate 41 and the silicon film 43 by the insulating film 65. Each of the first through electrodes 66 and the second through electrodes 67 and 68 is made of, for example, an electrically conductive material, such as copper, gold, or aluminum.

Each first through electrode 66 is joined to the corresponding first pad 23 through an electrically conductive joining member (not illustrated), such as a solder. Each second through electrode 67 is joined to the corresponding second pad 24 through an electrically conductive joining member (not illustrated), such as a solder. Each second through electrode 68 is joined to the corresponding second pad 25 through an electrically conductive joining member (not illustrated), such as a solder.

In a method of manufacturing the thermal flow sensor 1b according to the present embodiment, a step of making a base member 2 is similar to the step (S1) of making the base member 2 according to the first embodiment. With reference to FIGS. 37 to 51, an example of a step of making the cover 4b in the method of manufacturing the thermal flow sensor 1b according to the present embodiment will be described below.

Figure 37:
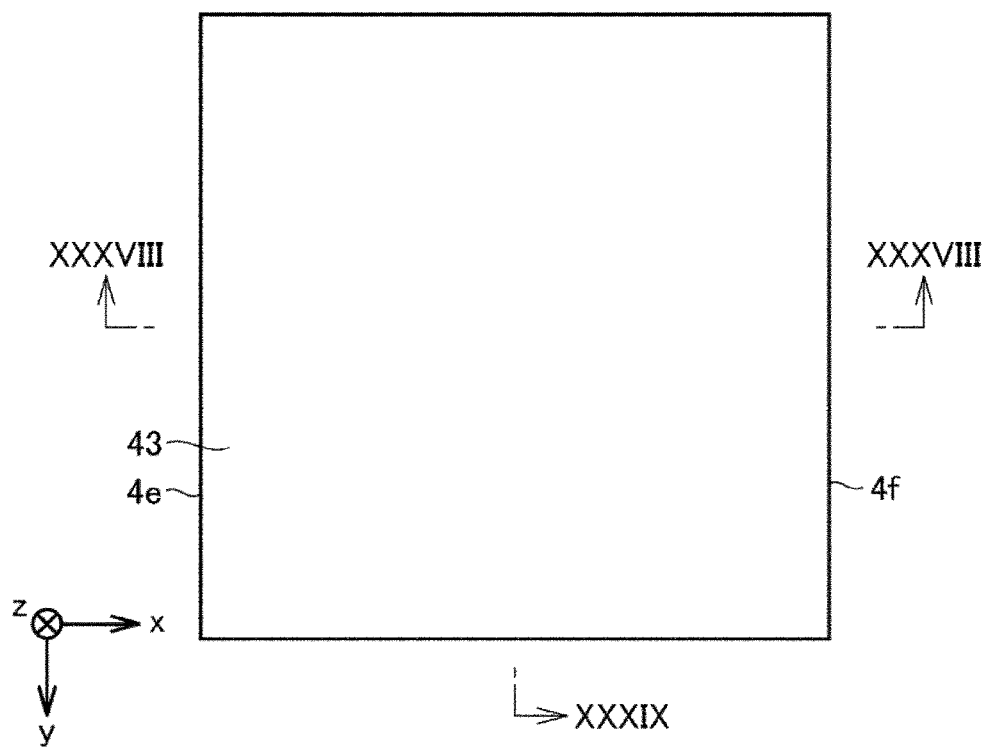
FIG. 37 is a schematic plan view illustrating a step in a step of making a cover in a method of manufacturing the thermal flow sensor according to the second embodiment.
Figure 38:
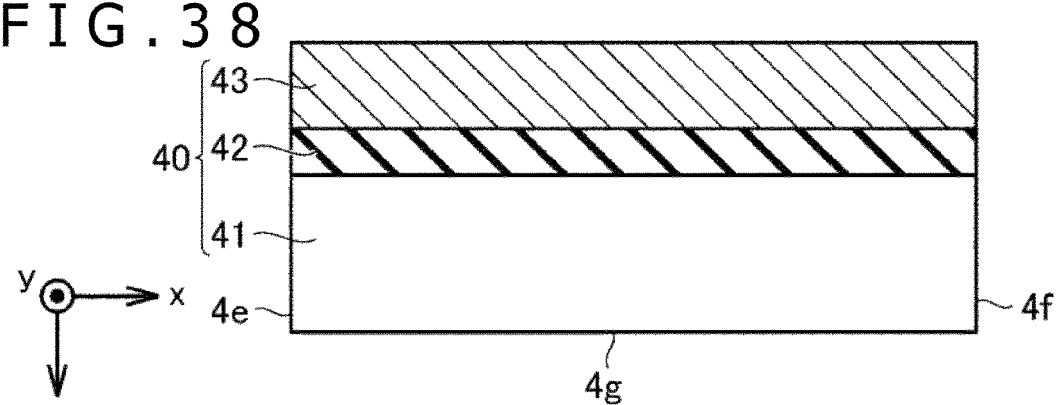
FIG. 38 is a schematic sectional view taken along line XXXVIII-XXXVIII in FIG. 37, illustrating the step illustrated in FIG. 37 in the step of making the cover in the method of manufacturing the thermal flow sensor according to the second embodiment.
Figure 39:
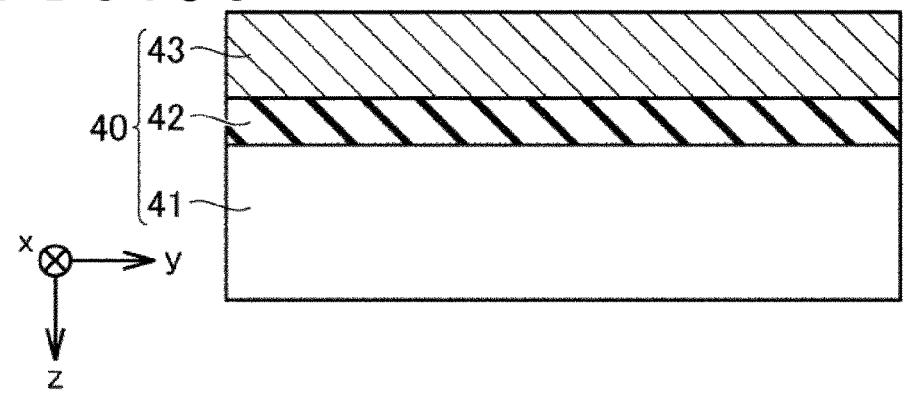
FIG. 39 is a schematic sectional view taken along line XXXIX-XXXIX in FIG. 37, illustrating the step illustrated in FIG. 37 in the step of making the cover in the method of manufacturing the thermal flow sensor according to the second embodiment.

Referring to FIGS. 37 to 39, an SOI substrate 40 is prepared. The SOI substrate 40 includes the silicon substrate 41, the silicon dioxide film 42 provided on the silicon substrate 41, and the silicon film 43 provided on the silicon dioxide film 42. The silicon dioxide film 42 lies between the silicon substrate 41 and the silicon film 43. The SOI substrate 40 includes a first side surface 4e, a second side surface 4f, and a third principal surface 4g.

Figure 40:
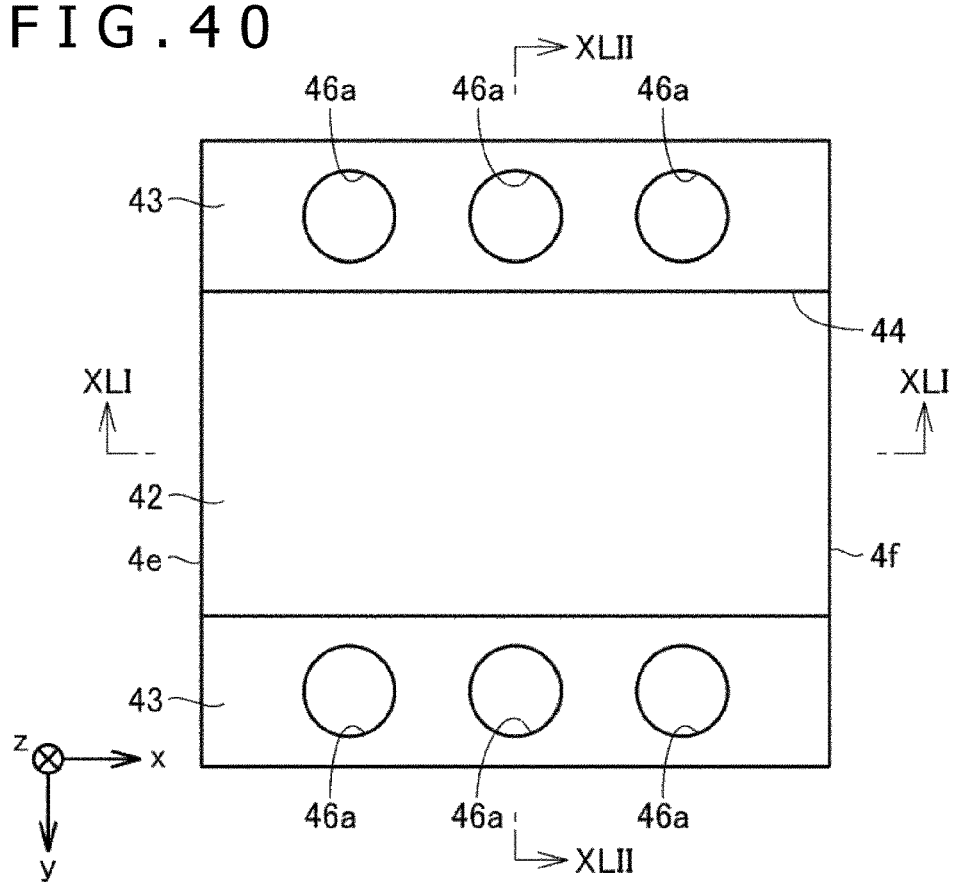
FIG. 40 is a schematic plan view illustrating a step following the step illustrated in FIGS. 37 to 39 in the step of making the cover in the method of manufacturing the thermal flow sensor according to the second embodiment.
Figure 41:
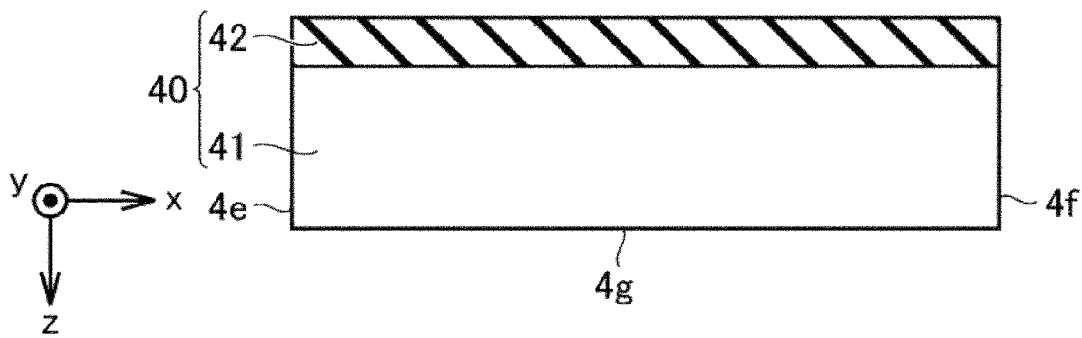
FIG. 41 is a schematic sectional view taken along line XLI-XLI in FIG. 40, illustrating the step illustrated in FIG. 40 in the step of making the cover in the method of manufacturing the thermal flow sensor according to the second embodiment.
Figure 42:
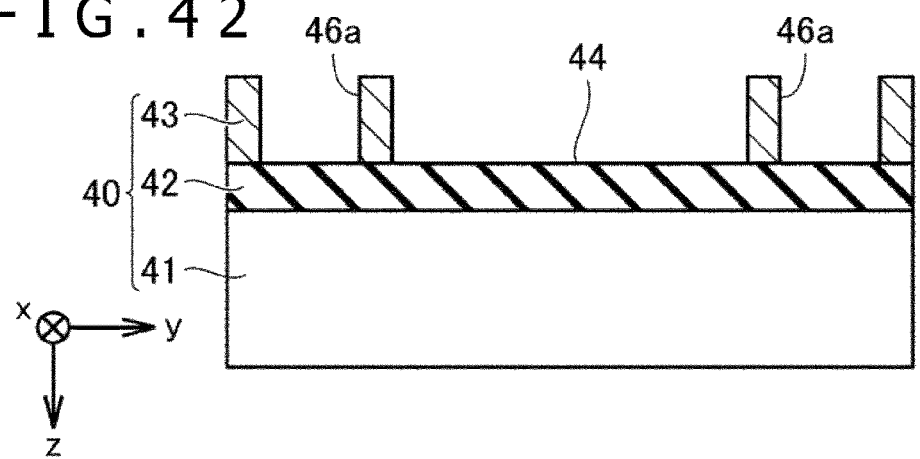
FIG. 42 is a schematic sectional view taken along line XLII-XLII in FIG. 40, illustrating the step illustrated in FIG. 40 in the step of making the cover in the method of manufacturing the thermal flow sensor according to the second embodiment.

Referring to FIGS. 40 to 42, portions of the silicon film 43 are removed employing a photolithography process or the like. Specifically, the silicon film 43 is subjected to etching employing a deep reactive-ion etching (DRIE) process, such as the Bosch process. The recessed portion 44 and side recessed portions 46a are thus formed in the silicon film 43.

A bottom surface of the recessed portion 44 is defined by an exposed surface of the silicon dioxide film 42 which is exposed from the silicon film 43. Side surfaces of the recessed portion 44 are defined by the silicon film 43. The depth of the recessed portion 44 is equal to the thickness of the silicon film 43 of the SOI substrate 40. This allows the depth of the recessed portion 44 to precisely be determined. The recessed portion 44 extends from the first side surface 4e to the second side surface 4f of the SOI substrate 40.

A bottom surface of each side recessed portion 46a is defined by an exposed surface of the silicon dioxide film 42 which is exposed from the silicon film 43. A side surface of the side recessed portion 46a is defined by the silicon film 43. A portion of the silicon film 43 remains between the recessed portion 44 and the side recessed portion 46a. The side recessed portions 46a lie on both sides of the recessed portion 44 in the second direction (y direction). The side recessed portions 46a are formed in portions of the silicon film 43 which correspond to the through holes 60, 61, and 62 of the cover 4b.

Figure 43:
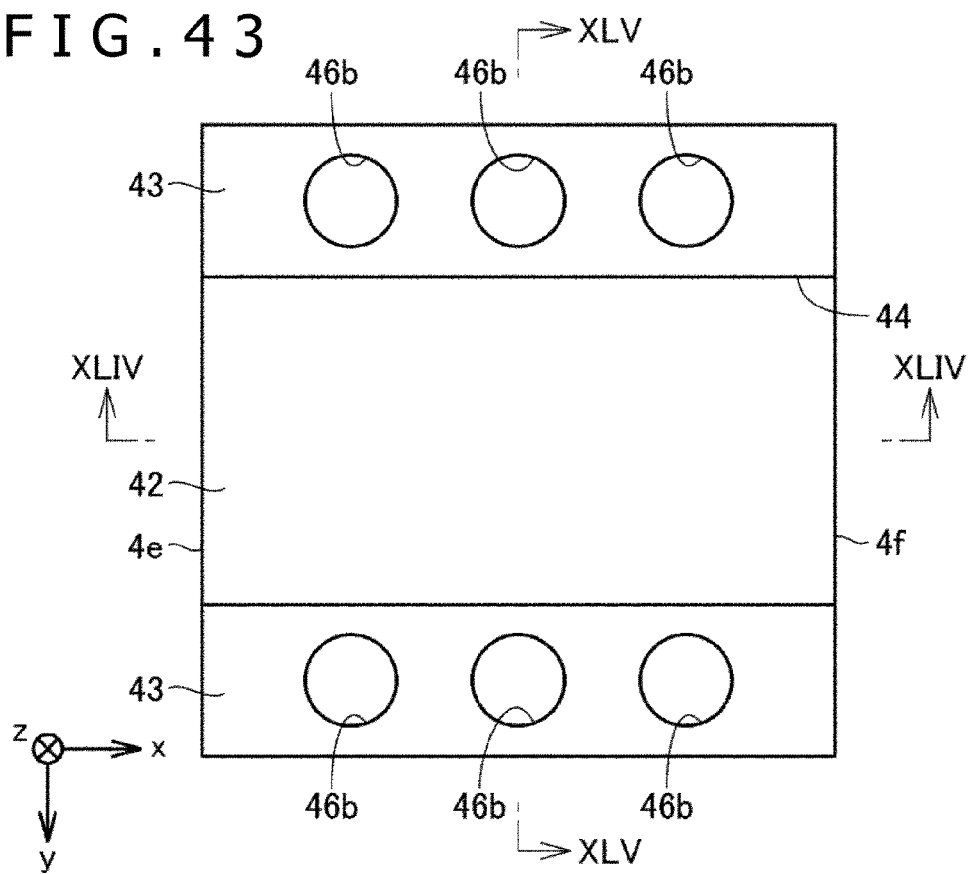
FIG. 43 is a schematic plan view illustrating a step following the step illustrated in FIGS. 40 to 42 in the step of making the cover in the method of manufacturing the thermal flow sensor according to the second embodiment.
Figure 44:
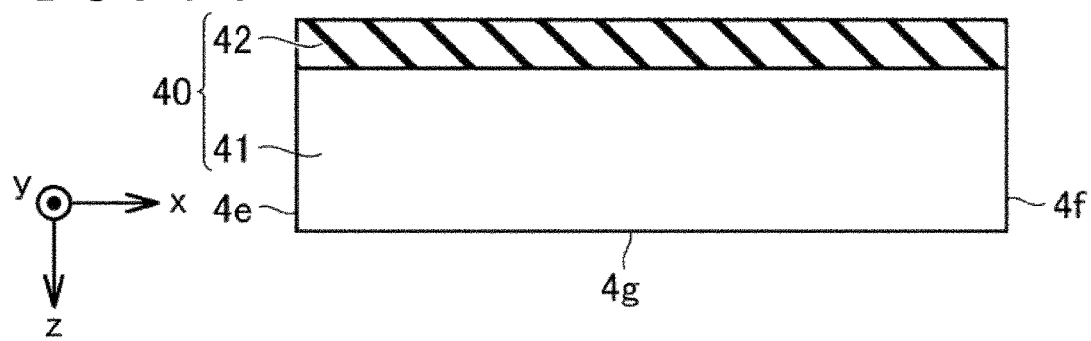
FIG. 44 is a schematic sectional view taken along line XLIV-XLIV in FIG. 43, illustrating the step illustrated in FIG. 43 in the step of making the cover in the method of manufacturing the thermal flow sensor according to the second embodiment.
Figure 45:
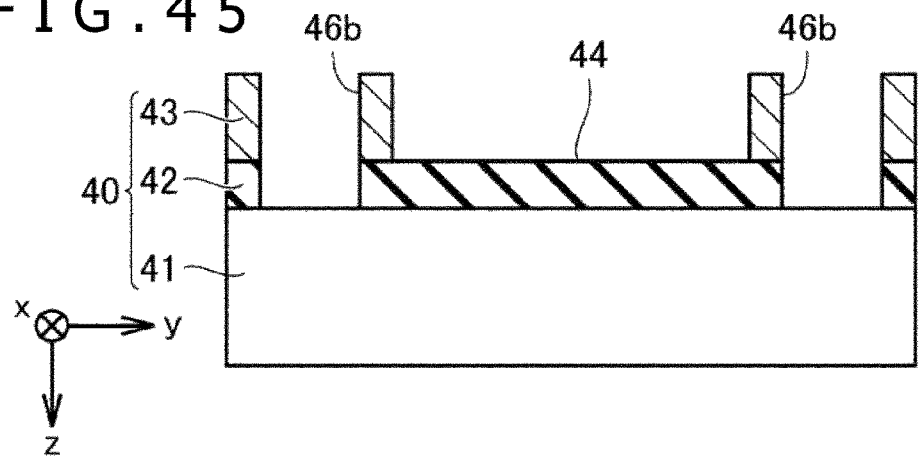
FIG. 45 is a schematic sectional view taken along line XLV-XLV in FIG. 43, illustrating the step illustrated in FIG. 43 in the step of making the cover in the method of manufacturing the thermal flow sensor according to the second embodiment.

Referring to FIGS. 43 to 45, portions of the silicon dioxide film 42 are removed employing a photolithography process or the like. More specifically, portions of the silicon dioxide film 42 which define the bottom surfaces of the side recessed portions 46a are removed. Specifically, the silicon dioxide film 42 is subjected to dry etching using an etching gas, such as $CF_4$, for example. Thus, side recessed portions 46b are formed. A bottom surface of each side recessed portion 46b is defined by a portion of a surface of the silicon substrate 41 which is exposed from the silicon dioxide film 42. A side surface of the side recessed portion 46b is defined by the silicon film 43 and the silicon dioxide film 42.

Figure 46:
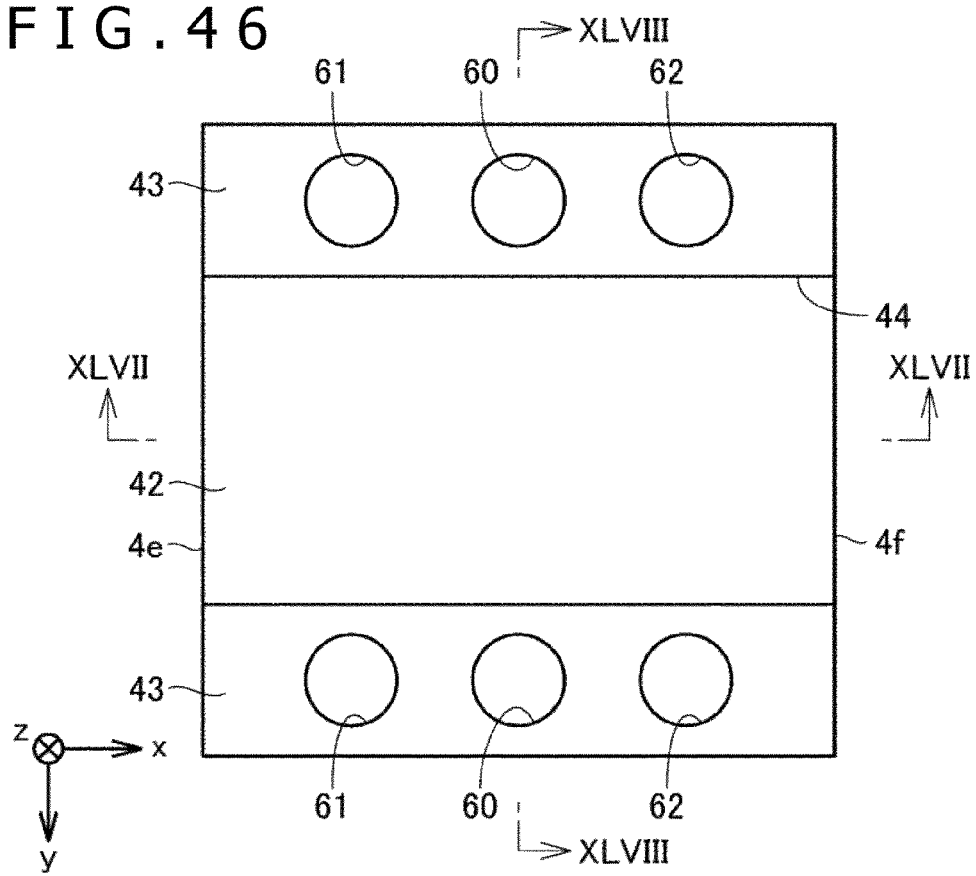
FIG. 46 is a schematic plan view illustrating a step following the step illustrated in FIGS. 43 to 45 in the step of making the cover in the method of manufacturing the thermal flow sensor according to the second embodiment.
Figure 47:
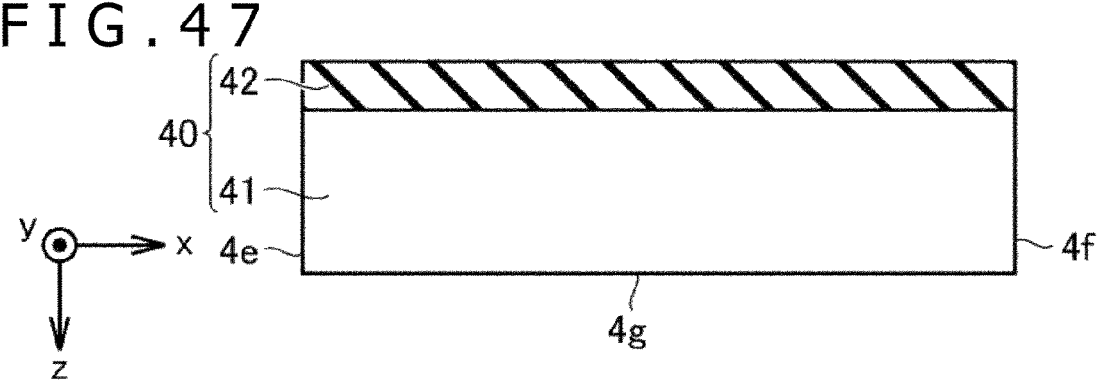
FIG. 47 is a schematic sectional view taken along line XLVII-XLVII in FIG. 46, illustrating the step illustrated in FIG. 46 in the step of making the cover in the method of manufacturing the thermal flow sensor according to the second embodiment.
Figure 48:
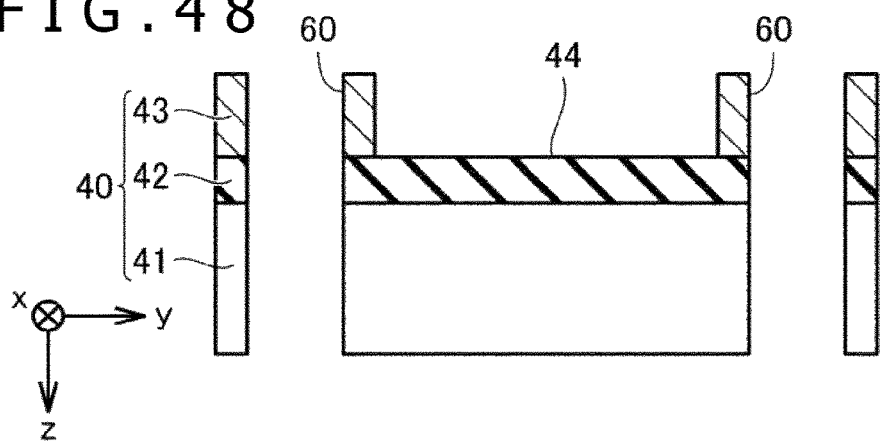
FIG. 48 is a schematic sectional view taken along line XLVIII-XLVIII in FIG. 46, illustrating the step illustrated in FIG. 46 in the step of making the cover in the method of manufacturing the thermal flow sensor according to the second embodiment.

Referring to FIGS. 46 to 48, portions of the silicon substrate 41 are removed employing a photolithography process or the like. More specifically, portions of the silicon substrate 41 which define the bottom surfaces of the side recessed portions 46b are removed. Specifically, the silicon substrate 41 is subjected to etching employing a deep reactive-ion etching (DRIE) process, such as the Bosch process. The through holes 60, 61, and 62 are thus formed in the cover 4b. Thus, the cover 4b is obtained.

Figure 49:
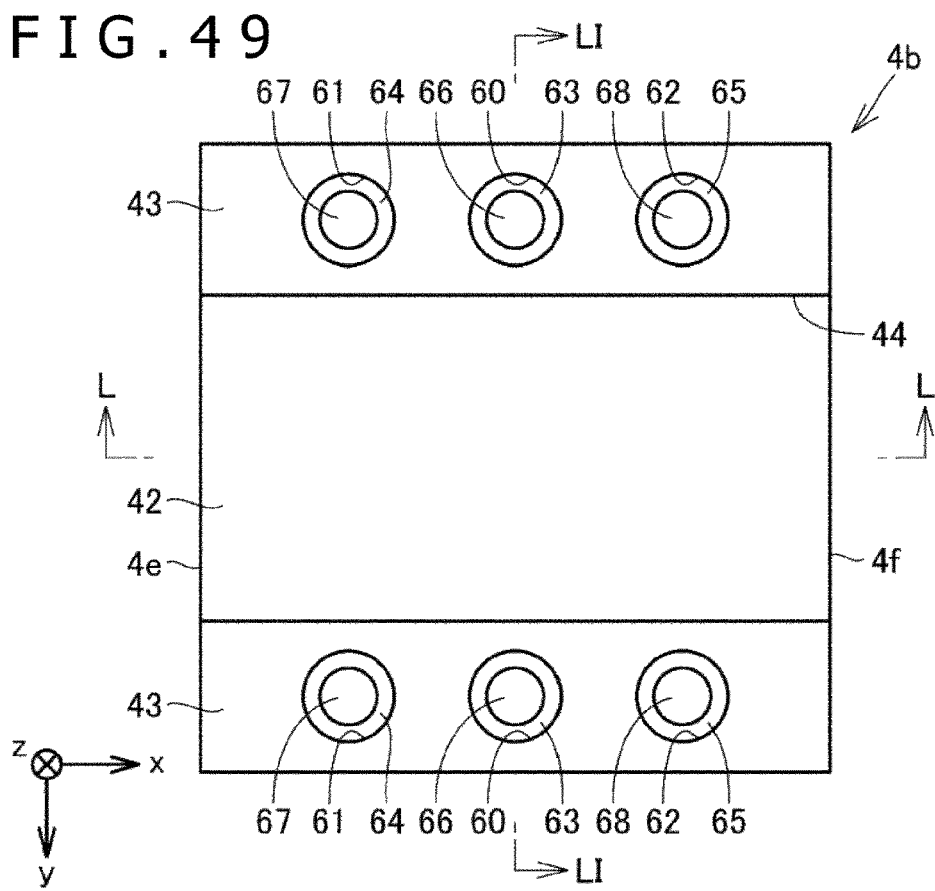
FIG. 49 is a schematic plan view illustrating a step following the step illustrated in FIGS. 46 to 48 in the step of making the cover in the method of manufacturing the thermal flow sensor according to the second embodiment.
Figure 50:
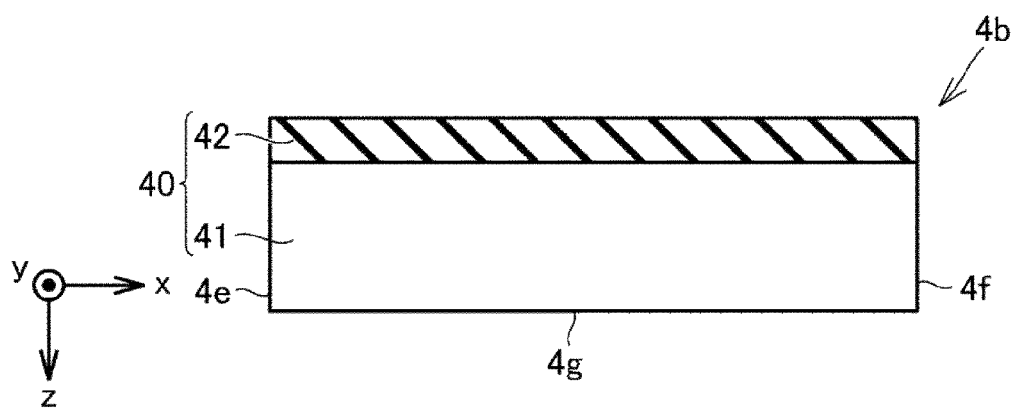
FIG. 50 is a schematic sectional view taken along line L-L in FIG. 49, illustrating the step illustrated in FIG. 49 in the step of making the cover in the method of manufacturing the thermal flow sensor according to the second embodiment.
Figure 51:
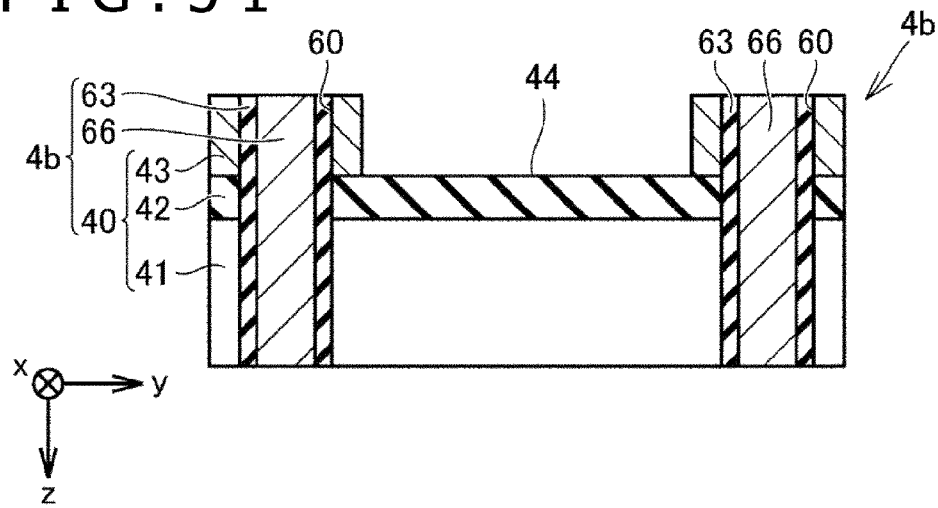
FIG. 51 is a schematic sectional view taken along line LI-LI in FIG. 49, illustrating the step illustrated in FIG. 49 in the step of making the cover in the method of manufacturing the thermal flow sensor according to the second embodiment.

Referring to FIGS. 49 to 51, the insulating film 63 is formed on the surface of each through hole 60. The insulating film 64 is formed on the surface of each through hole 61. The insulating film 65 is formed on the surface of each through hole 62. Each of the insulating films 63, 64, and 65 is formed by, for example, a CVD process.

Then, the first through electrodes 66 are formed in the through holes 60. More specifically, the first through electrodes 66 are formed in the holes defined by the insulating films 63. The second through electrodes 67 are formed in the through holes 61. More specifically, the second through electrodes 67 are formed in the holes defined by the insulating films 64. The second through electrodes 68 are formed in the through holes 62. More specifically, the second through electrodes 68 are formed in the holes defined by the insulating films 65. Each of the first through electrodes 66 and the second through electrodes 67 and 68 is formed by, for example, a vacuum deposition process or a sputtering process.

In a step of fixing the cover 4b to the base member 2, the cover 4b is fixed to a first principal surface 2a of the base member 2. The cover 4b is joined to the first principal surface 2a of the base member 2 using a joining member (not illustrated), such as an adhesive, for example. When the cover 4b is fixed to the first principal surface 2a of the base member 2, each first through electrode 66 is joined to the corresponding first pad 23 through the joining member (not illustrated), such as the solder, and each of the second through electrodes 67 and 68 is joined to the corresponding one of the second pads 24 and 25 through the joining member (not illustrated), such as the solder. Thus, a flow passage 50 (i.e., a main flow passage portion 50a) is formed. The flow passage 50 (i.e., the main flow passage portion 50a) is defined by the exposed surface of the silicon dioxide film 42 which defines the bottom surface of the recessed portion 44, portions of the silicon film 43 which define the side surfaces of the recessed portion 44, and the first principal surface 2a. Thus, the thermal flow sensor 1b is obtained.

The thermal flow sensor 1b according to the present embodiment exhibits the following effects in addition to the effects of the thermal flow sensor 1 according to the first embodiment.

In the thermal flow sensor 1b according to the present embodiment, the base member 2 further includes the first pads 23 and first wires 26. Each first wire 26 is connected to a heater 20 and the corresponding first pad 23. The cover 4b further includes the first through electrodes 66. Each first through electrode 66 passes through the cover 4b in the third direction (z direction) and is electrically connected to the corresponding first pad 23.

The cover 4b includes the first through electrodes 66. This makes it possible to supply power to the heater 20 from outside the thermal flow sensor 1b by surface-mounting the thermal flow sensor 1b on a printed circuit board (not illustrated) with wires formed thereon. In other words, the first through electrodes 66 enable power to be supplied to the heater 20 from outside the thermal flow sensor 1b without using electrically conductive wires. This makes it easier to supply power to the heater 20 from outside the thermal flow sensor 1b.

In the thermal flow sensor 1b according to the present embodiment, the base member 2 further includes the first pads 23, the second pads 24 and/or 25, the first wires 26, and second wires 27 and/or 28. Each first wire 26 is connected to the heater 20 and the corresponding first pad 23. The second wires 27 and/or 28 are connected to at least one of a first temperature sensor 21 or a second temperature sensor 22 and to the corresponding second pads 24 and/or 25. The cover 4b further includes the first through electrodes 66 and the second through electrodes 67 and 68. Each first through electrode 66 passes through the cover 4b in the third direction (z direction) and is electrically connected to the corresponding first pad 23. Each of the second through electrodes 67 and 68 passes through the cover 4b in the third direction (z direction) and is electrically connected to the corresponding one of the second pads 24 and 25.

The cover 4b includes the first through electrodes 66. This makes it possible to supply power to the heater 20 from outside the thermal flow sensor 1b by surface-mounting the thermal flow sensor 1b on a printed circuit board (not illustrated). In other words, the first through electrodes 66 enable power to be supplied to the heater 20 from outside the thermal flow sensor 1b without using electrically conductive wires. This makes it easier to supply power to the heater 20 from outside the thermal flow sensor 1b.

The cover 4b includes the second through electrodes 67 and 68. This makes it possible to read an output of at least one of the first temperature sensor 21 or the second temperature sensor 22 out of the thermal flow sensor 1b by surface-mounting the thermal flow sensor 1b on a printed circuit board (not illustrated). In other words, the second through electrodes 67 and 68 enable the output of the at least one of the first temperature sensor 21 and the second temperature sensor 22 to be read out of the thermal flow sensor 1b without using electrically conductive wires. This makes it easier to read the output of the at least one of the first temperature sensor 21 or the second temperature sensor 22 out of the thermal flow sensor 1b.

Third Embodiment

Figure 52:
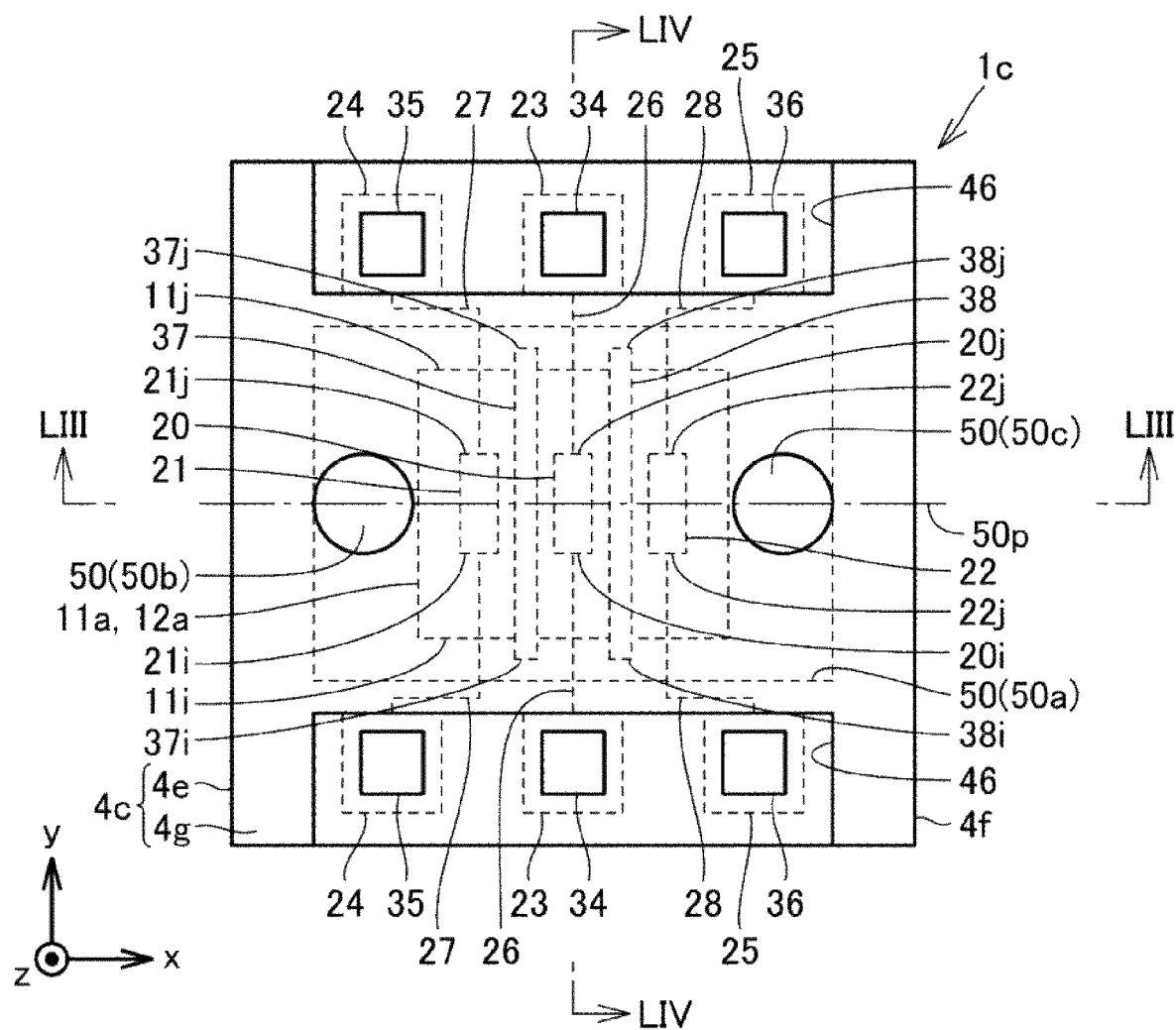
FIG. 52 is a schematic plan view of a thermal flow sensor according to a third embodiment of the present disclosure.
Figure 53:
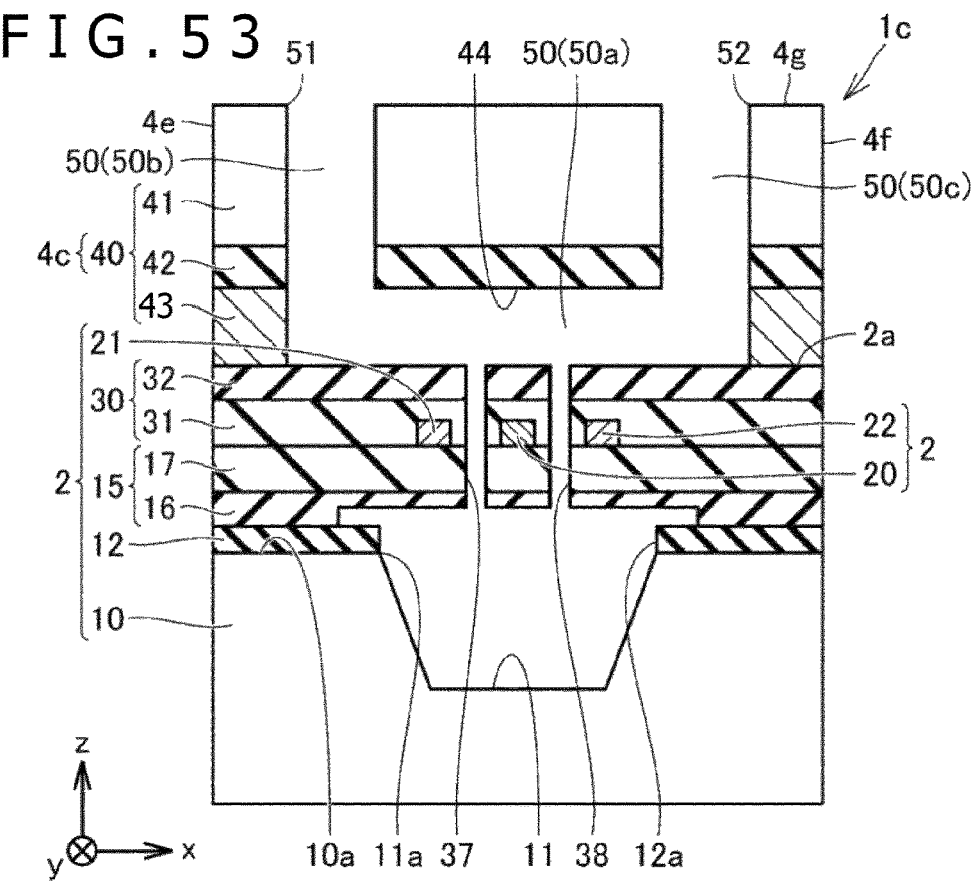
FIG. 53 is a schematic sectional view of the thermal flow sensor according to the third embodiment taken along line LIII-LIII in FIG. 52.
Figure 54:
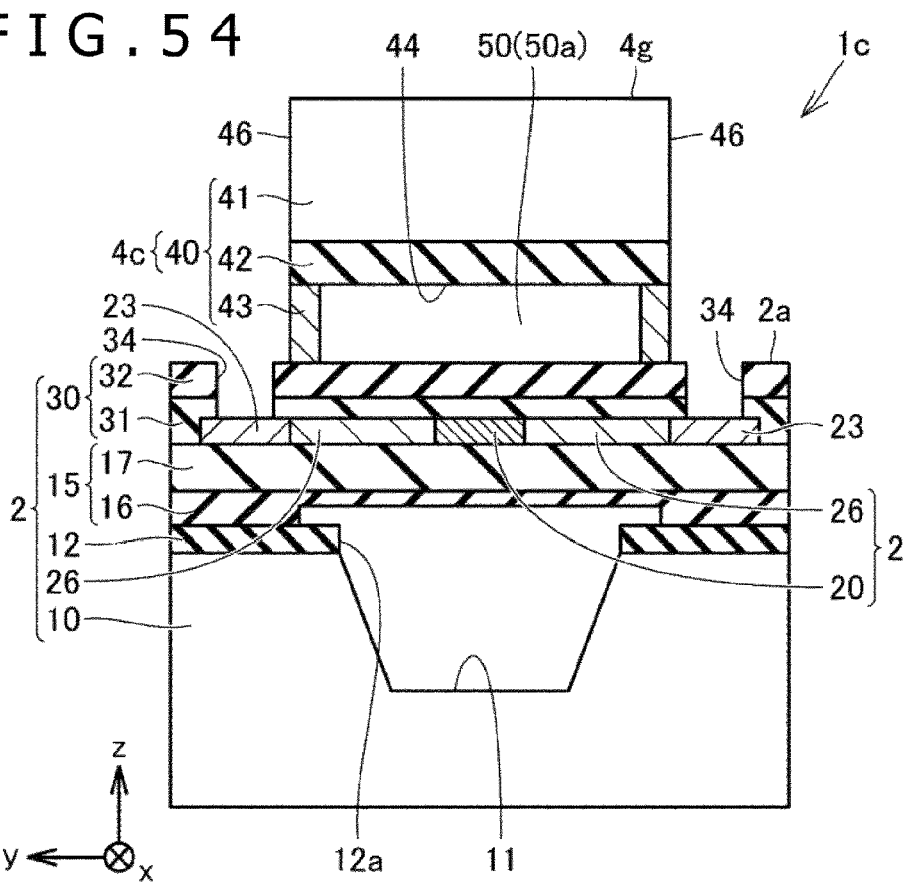
FIG. 54 is a schematic sectional view of the thermal flow sensor according to the third embodiment taken along line LIV-LIV in FIG. 52.

With reference to FIGS. 52, 53, and 54, a thermal flow sensor 1c according to a third embodiment of the present disclosure will be described. The thermal flow sensor 1c according to the present embodiment is similar in structure to the thermal flow sensor 1 according to the first embodiment, but is different from the thermal flow sensor 1 primarily in the following respects.

The thermal flow sensor 1c includes a cover 4c in place of the cover 4 according to the first embodiment. In the cover 4c, an inlet 51 and an outlet 52 of a flow passage 50 are defined in a third principal surface 4g of the cover 4c. The flow passage 50 includes a main flow passage portion 50a, a first secondary flow passage portion 50b, and a second secondary flow passage portion 50c. The first secondary flow passage portion 50b is in communication with the inlet 51 and the main flow passage portion 50a. The second secondary flow passage portion 50c is in communication with the outlet 52 and the main flow passage portion 50a. Each of the first secondary flow passage portion 50b and the second secondary flow passage portion 50c extends in the third direction (z direction). The first secondary flow passage portion 50b and the second secondary flow passage portion 50c of the flow passage 50 are defined in a silicon substrate 41 and a silicon dioxide film 42 of the cover 4c.

In a method of manufacturing the thermal flow sensor 1c according to the present embodiment, a step of making a base member 2 is similar to the step (S1) of making the base member 2 according to the first embodiment. With reference to FIGS. 55 to 66, an example of a step of making the cover 4c in the method of manufacturing the thermal flow sensor 1c according to the present embodiment will be described below.

Figure 55:
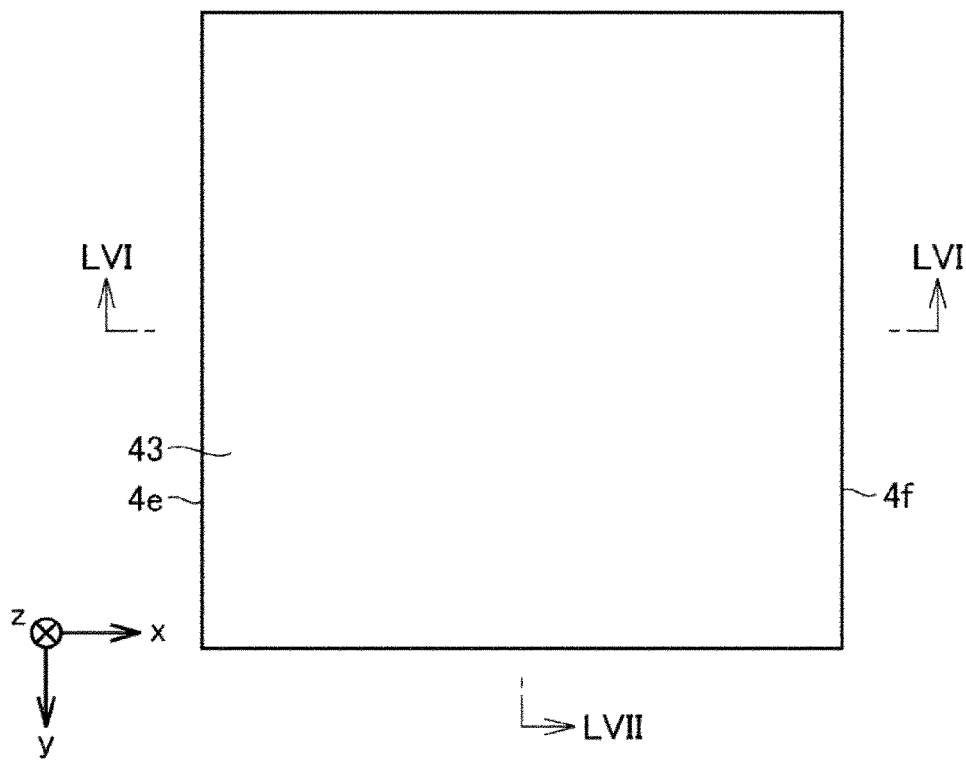
FIG. 55 is a schematic plan view illustrating a step in a step of making a cover in a method of manufacturing the thermal flow sensor according to the third embodiment.
Figure 56:
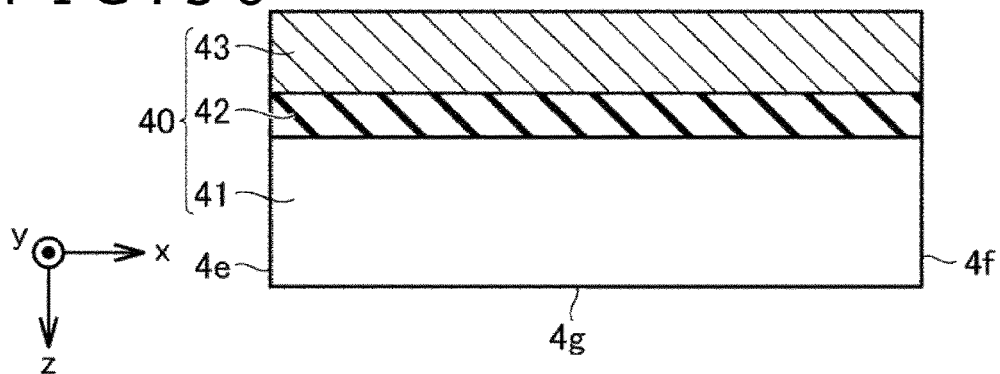
FIG. 56 is a schematic sectional view taken along line LVI-LVI in FIG. 55, illustrating the step illustrated in FIG. 55 in the step of making the cover in the method of manufacturing the thermal flow sensor according to the third embodiment.
Figure 57:
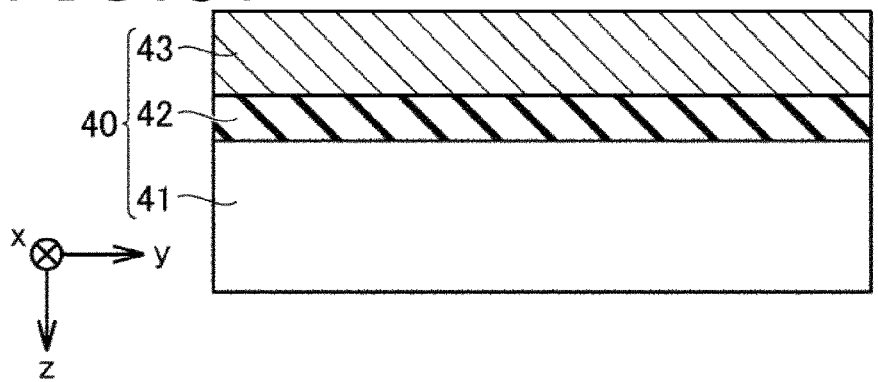
FIG. 57 is a schematic sectional view taken along line LVII-LVII in FIG. 55, illustrating the step illustrated in FIG. 55 in the step of making the cover in the method of manufacturing the thermal flow sensor according to the third embodiment.

Referring to FIGS. 55 to 57, an SOI substrate 40 is prepared. The SOI substrate 40 includes the silicon substrate 41, the silicon dioxide film 42 provided on the silicon substrate 41, and a silicon film 43 provided on the silicon dioxide film 42. The silicon dioxide film 42 lies between the silicon substrate 41 and the silicon film 43. The SOI substrate 40 includes a first side surface 4e, a second side surface 4f, and the third principal surface 4g.

Figure 58:
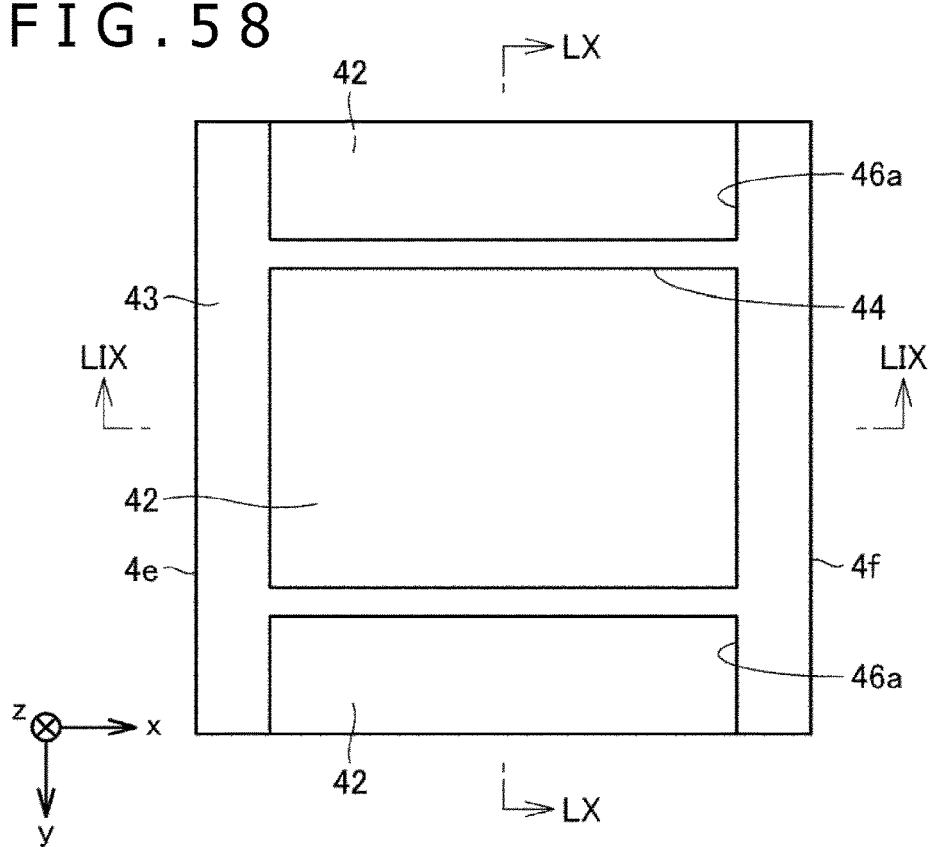
FIG. 58 is a schematic plan view illustrating a step following the step illustrated in FIGS. 55 to 57 in the step of making the cover in the method of manufacturing the thermal flow sensor according to the third embodiment.
Figure 59:
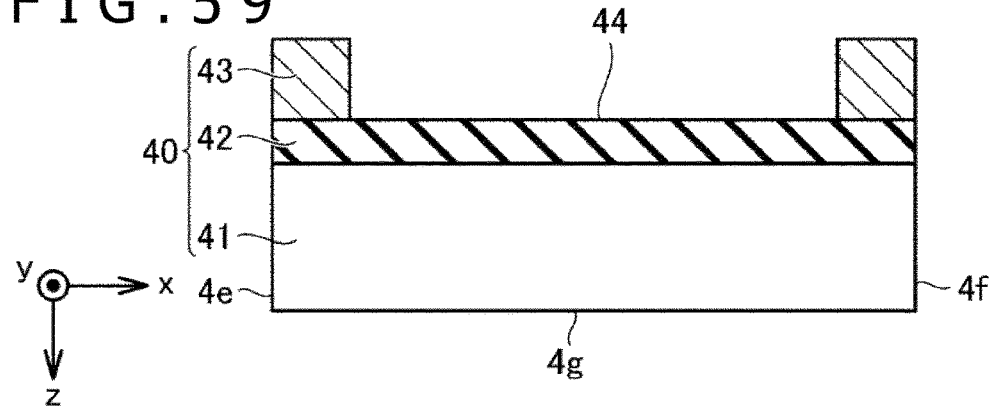
FIG. 59 is a schematic sectional view taken along line LIX-LIX in FIG. 58, illustrating the step illustrated in FIG. 58 in the step of making the cover in the method of manufacturing the thermal flow sensor according to the third embodiment.
Figure 60:
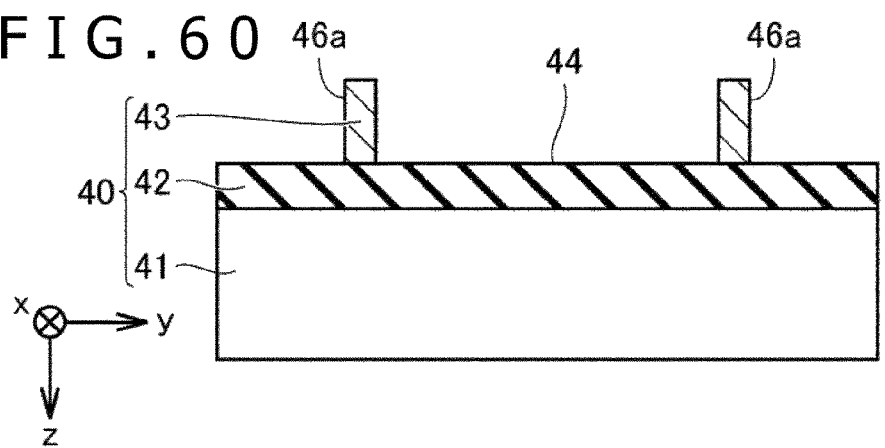
FIG. 60 is a schematic sectional view taken along line LX-LX in FIG. 58, illustrating the step illustrated in FIG. 58 in the step of making the cover in the method of manufacturing the thermal flow sensor according to the third embodiment.

Referring to FIGS. 58 to 60, portions of the silicon film 43 are removed employing a photolithography process or the like. Specifically, the silicon film 43 is subjected to etching employing a deep reactive-ion etching (DRIE) process, such as the Bosch process. A recessed portion 44 and side recessed portions 46a are formed in the silicon film 43.

A bottom surface of the recessed portion 44 is defined by an exposed surface of the silicon dioxide film 42 which is exposed from the silicon film 43. Side surfaces of the recessed portion 44 are defined by the silicon film 43. The depth of the recessed portion 44 is equal to the thickness of the silicon film 43 of the SOI substrate 40. This allows the depth of the recessed portion 44 to precisely be determined. The recessed portion 44 is terminated by the silicon film 43 in the first direction (x direction). The recessed portion 44 does not extend up to either of the first side surface 4e and the second side surface 4f of the SOI substrate 40.

A bottom surface of each side recessed portion 46a is defined by an exposed surface of the silicon dioxide film 42 which is exposed from the silicon film 43. A side surface of the side recessed portion 46a is defined by the silicon film 43. A portion of the silicon film 43 remains between the recessed portion 44 and the side recessed portion 46a. The side recessed portions 46a lie on both sides of the recessed portion 44 in the second direction (y direction). The side recessed portions 46a are formed in portions of the silicon film 43 which correspond to through holes 46 of the cover 4c.

Figure 61:
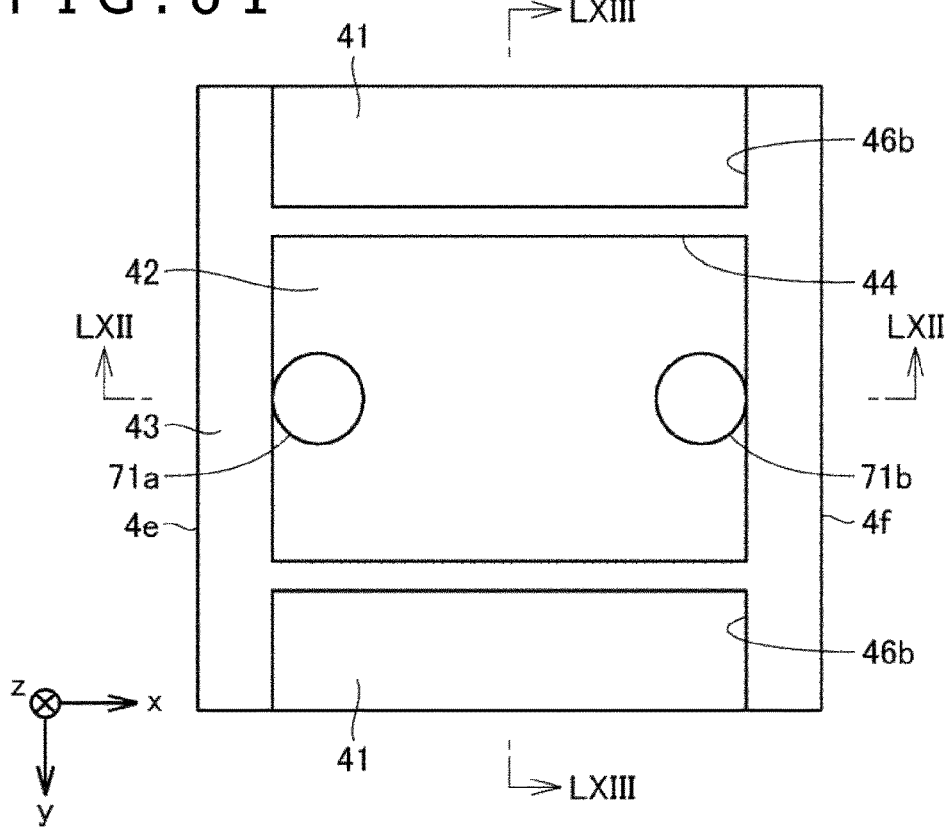
FIG. 61 is a schematic plan view illustrating a step following the step illustrated in FIGS. 58 to 60 in the step of making the cover in the method of manufacturing the thermal flow sensor according to the third embodiment.
Figure 62:
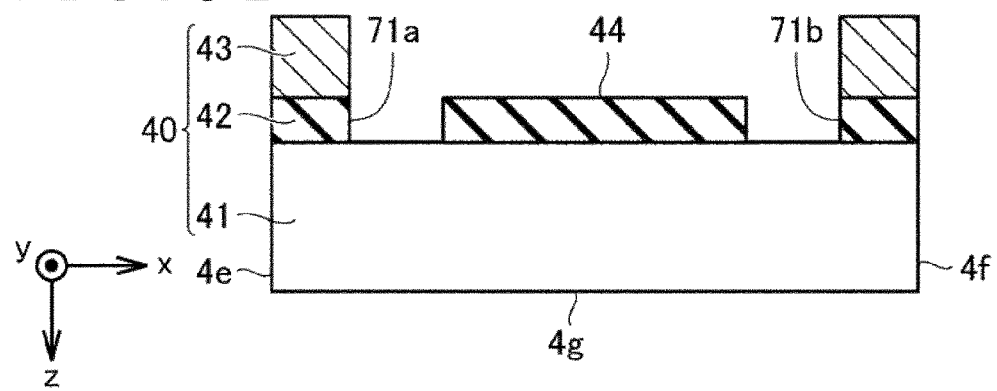
FIG. 62 is a schematic sectional view taken along line LXII-LXII in FIG. 61, illustrating the step illustrated in FIG. 61 in the step of making the cover in the method of manufacturing the thermal flow sensor according to the third embodiment.
Figure 63:
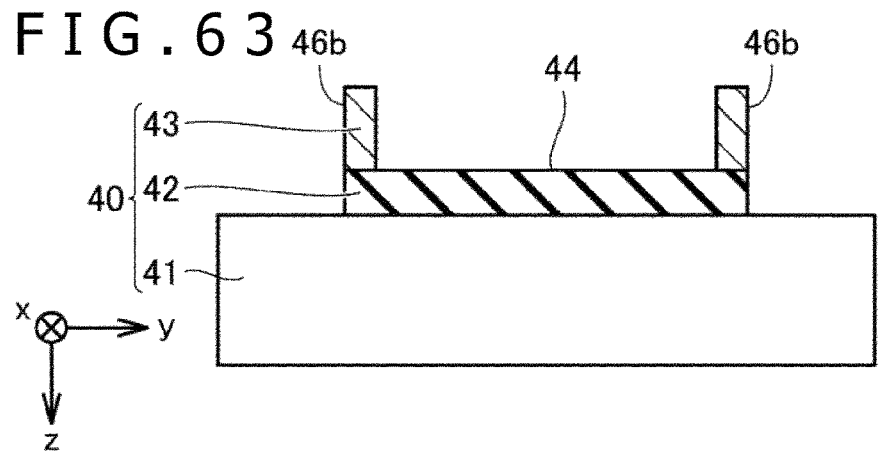
FIG. 63 is a schematic sectional view taken along line LXIII-LXIII in FIG. 61, illustrating the step illustrated in FIG. 61 in the step of making the cover in the method of manufacturing the thermal flow sensor according to the third embodiment.

Referring to FIGS. 61 to 63, portions of the silicon dioxide film 42 are removed employing a photolithography process or the like. More specifically, portions of the silicon dioxide film 42 which define the bottom surfaces of the side recessed portions 46a, and portions of the silicon dioxide film 42 which correspond to the first secondary flow passage portion 50b and the second secondary flow passage portion 50c, are removed. Specifically, the silicon dioxide film 42 is subjected to dry etching using an etching gas, such as $CF_4$, for example. Thus, side recessed portions 46b and recessed portions 71a and 71b are formed. A bottom surface of each side recessed portion 46b is defined by a portion of a surface of the silicon substrate 41 which is exposed from the silicon dioxide film 42. A side surface of the side recessed portion 46b is defined by the silicon film 43 and the silicon dioxide film 42. A bottom surface of each of the recessed portions 71a and 71b is defined by a portion of the surface of the silicon substrate 41 which is exposed from the silicon dioxide film 42. A side surface of each of the recessed portions 71a and 71b is defined by the silicon dioxide film 42.

Figure 64:
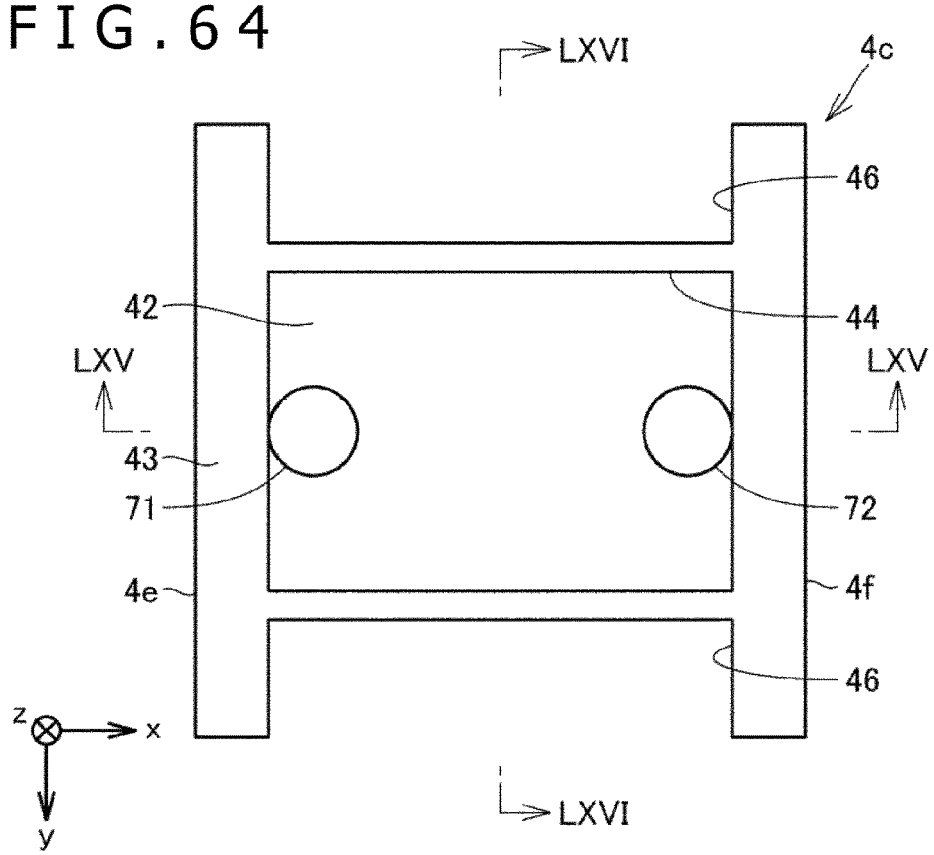
FIG. 64 is a schematic plan view illustrating a step following the step illustrated in FIGS. 61 to 63 in the step of making the cover in the method of manufacturing the thermal flow sensor according to the third embodiment.
Figure 65:
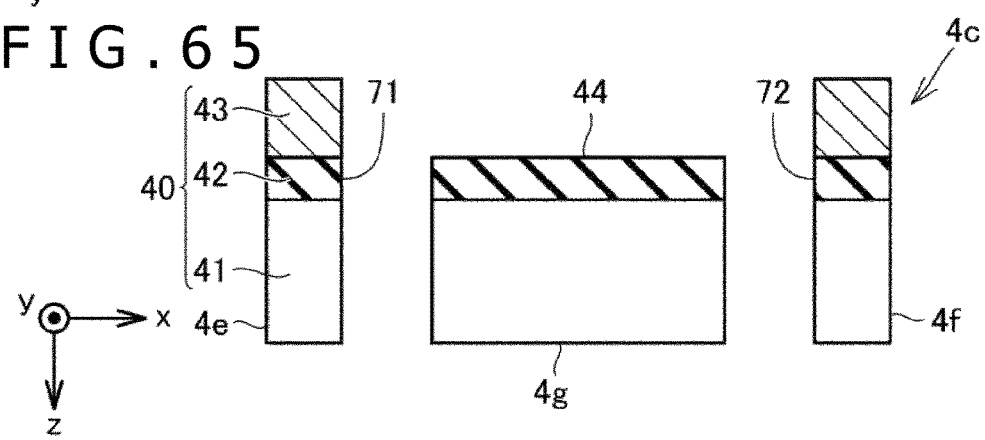
FIG. 65 is a schematic sectional view taken along line LXV-LXV in FIG. 64, illustrating the step illustrated in FIG. 64 in the step of making the cover in the method of manufacturing the thermal flow sensor according to the third embodiment.
Figure 66:
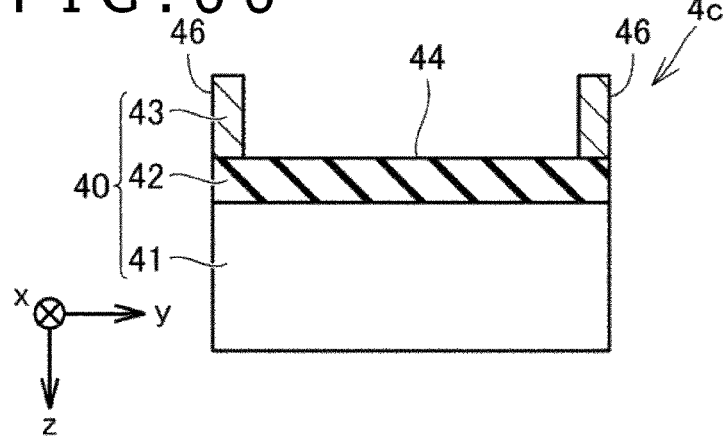
FIG. 66 is a schematic sectional view taken along line LXVI-LXVI in FIG. 64, illustrating the step illustrated in FIG. 64 in the step of making the cover in the method of manufacturing the thermal flow sensor according to the third embodiment.

Referring to FIGS. 64 to 66, portions of the silicon substrate 41 are removed employing a photolithography process or the like. More specifically, portions of the silicon substrate 41 which define the bottom surfaces of the side recessed portions 46b, and portions of the silicon substrate 41 which define the bottom surfaces of the recessed portions 71a and 71b, are removed. Specifically, the silicon substrate 41 is subjected to etching employing a deep reactive-ion etching (DRIE) process, such as the Bosch process. The through holes 46, the first secondary flow passage portion 50b, and the second secondary flow passage portion 50c are thus formed in the cover 4c. Thus, the cover 4c is obtained.

A step of fixing the cover 4c to the base member 2 according to the present embodiment is similar to the step (S3) of fixing the cover 4 to the base member 2 according to the first embodiment. The main flow passage portion 50a, which extends along a first principal surface 2a, of the flow passage 50 is formed. The main flow passage portion 50a is defined by the exposed surface of the silicon dioxide film 42 which defines the bottom surface of the recessed portion 44, the portions of the silicon film 43 which define the side surfaces of the recessed portion 44, and the first principal surface 2a. The main flow passage portion 50a is in communication with the first secondary flow passage portion 50b and the second secondary flow passage portion 50c. The thermal flow sensor 1c is obtained.

The thermal flow sensor 1c according to the present embodiment exhibits the following effects, similar to the effects of the thermal flow sensor 1 according to the first embodiment.

In the thermal flow sensor 1c according to the present embodiment, the cover 4c includes the third principal surface 4g, which is distant from the base member 2. The inlet 51 and the outlet 52 of the flow passage 50 are defined in the third principal surface 4g. The first secondary flow passage portion 50b and the second secondary flow passage portion 50c of the flow passage 50 are defined in the silicon substrate 41 and the silicon dioxide film 42 of the cover 4c. The first secondary flow passage portion 50b is in communication with the inlet 51 and the main flow passage portion 50a. The second secondary flow passage portion 50c is in communication with the outlet 52 and the main flow passage portion 50a. Thus, the thermal flow sensor 1c is able to measure the flow rate of a fluid with improved precision.

The first, second, and third embodiments and the modifications thereof disclosed herein should be considered to be in all aspects illustrative and not restrictive. At least two of the first, second, and third embodiments and the modifications thereof disclosed herein may be combined as long as no conflict arises. The scope of the present disclosure is meant to be defined not by the foregoing description but by the appended claims, and to encompass all modifications within the gist and scope equivalent to those of the appended claims.

What is claimed is:

1. A thermal flow sensor comprising:
   a base member including a first principal surface extending in a first direction and a second direction perpendicular to the first direction;
   a cover fixed to the first principal surface; and
   a flow passage, wherein
   the base member includes a heater,
   the cover is formed by a silicon on insulator substrate including a silicon substrate, a silicon dioxide film provided on the silicon substrate, and a silicon film provided on the silicon dioxide film,
   the silicon film has a recessed portion defined therein, the recessed portion having a bottom surface defined by an exposed surface of the silicon dioxide film which is exposed from the silicon film, the recessed portion having a side surface defined by the silicon film,
   the flow passage includes a main flow passage portion extending along the first principal surface, and defined by the exposed surface of the silicon dioxide film which defines the bottom surface of the recessed portion, the silicon film defining the side surface of the recessed portion, and the first principal surface,
   in a plan view of the first principal surface, the main flow passage portion has a first longitudinal direction parallel to the first direction,
   the cover has an inlet and an outlet of the flow passage defined therein, and
   the heater is opposed to the main flow passage portion in a third direction perpendicular to both the first direction and the second direction.

2. The thermal flow sensor according to claim 1, wherein the base member further includes a substrate including a second principal surface, and a first insulating film provided on the second principal surface,
   the heater is provided on the first insulating film, and
   the first insulating film is arranged between the heater and the substrate.

3. The thermal flow sensor according to claim 2, wherein the base member further includes at least one of a first temperature sensor or a second temperature sensor, the first temperature sensor being disposed closer to the inlet of the flow passage than is the heater, the second temperature sensor being disposed closer to the outlet of the flow passage than is the heater,
   the at least one of the first temperature sensor or the second temperature sensor is provided on the first insulating film, and
   the at least one of the first temperature sensor or the second temperature sensor is opposed to the main flow passage portion in the third direction.

4. The thermal flow sensor according to claim 3, wherein the first insulating film has at least one of a first slit or a second slit defined therein, the first slit being provided between the heater and the first temperature sensor, the second slit being provided between the heater and the second temperature sensor, and
   at least one of the first slit or the second slit has a second longitudinal direction parallel to the second direction.

5. The thermal flow sensor according to claim 4, wherein first opposite ends of the at least one of the first slit or the second slit in the second direction are more distant from a center line of the main flow passage portion in the second direction than are second opposite ends of the heater in the second direction.

6. The thermal flow sensor according to claim 4, wherein the substrate has a cavity at a portion thereof corresponding to the heater and the at least one of the first temperature sensor or the second temperature sensor,
   the cavity has an opening portion defined in the second principal surface of the substrate, and
   the cavity is in communication with the at least one of the first slit or the second slit.

7. The thermal flow sensor according to claim 6, wherein first opposite ends of the at least one of the first slit or the second slit in the second direction are more distant from a center line of the main flow passage portion in the second direction than are opposite edges of the opening portion of the cavity in the second direction.

8. The thermal flow sensor according to claim 2, wherein the first insulating film includes a first silicon dioxide layer and a first silicon nitride layer, and
   a first ratio of a second thickness of the first silicon dioxide layer to a first thickness of the first silicon nitride layer is greater than 1.0 and equal to or smaller than 5.5.

9. The thermal flow sensor according to claim 2, wherein the base member further includes a second insulating film covering the heater.

10. The thermal flow sensor according to claim 4, wherein the base member further includes a second insulating film covering the heater, and
    the at least one of the first slit or the second slit is defined in the first insulating film and the second insulating film.

11. The thermal flow sensor according to claim 9, wherein the second insulating film includes a second silicon dioxide layer and a second silicon nitride layer, and
    a second ratio of a fourth thickness of the second silicon dioxide layer to a third thickness of the second silicon nitride layer is greater than 1.0 and equal to or smaller than 5.5.

12. The thermal flow sensor according to claim 1, wherein the base member further includes a first pad and a first wire, the first wire is connected to the heater and the first pad, and the first pad is exposed from the cover in the plan view of the first principal surface.

13. The thermal flow sensor according to claim 3, wherein the base member further includes a first pad, a second pad, a first wire, and a second wire, the first wire is connected to the heater and the first pad, the second wire is connected to the second pad and the at least one of the first temperature sensor or the second temperature sensor, and the first pad and the second pad are exposed from the cover in the plan view of the first principal surface.

14. The thermal flow sensor according to claim 1, wherein the base member further includes a first pad and a first wire, the first wire is connected to the heater and the first pad, the cover further includes a first through electrode, and the first through electrode passes through the cover in the third direction and is electrically connected to the first pad.

15. The thermal flow sensor according to claim 3, wherein the base member further includes a first pad, a second pad, a first wire, and a second wire, the first wire is connected to the heater and the first pad, the second wire is connected to the second pad and the at least one of the first temperature sensor or the second temperature sensor, the cover further includes a first through electrode and a second through electrode, the first through electrode passes through the cover in the third direction and is electrically connected to the first pad, and the second through electrode passes through the cover in the third direction and is electrically connected to the second pad.

16. The thermal flow sensor according to claim 1, wherein the cover includes a first side surface and a second side surface that define opposite end surfaces of the cover in the first direction, the inlet of the flow passage is defined in the first side surface, the outlet of the flow passage is defined in the second side surface, and the flow passage has a shape of a straight line in the plan view of the first principal surface.

17. The thermal flow sensor according to claim 1, wherein the cover includes a third principal surface that is distant from the base member, the inlet and the outlet of the flow passage are defined in the third principal surface, the flow passage further includes a first secondary flow passage and a second secondary flow passage defined in the silicon substrate and the silicon dioxide film of the cover, the first secondary flow passage is in communication with the inlet and the main flow passage portion, and the second secondary flow passage is in communication with the outlet and the main flow passage portion.

\* \* \* \* \*